US012798028B2

(12) United States Patent
Abbott et al.

(10) Patent No.: US 12,798,028 B2
(45) Date of Patent: Nov. 17, 2026

(54) POWER TOOL INCLUDING A MACHINE LEARNING BLOCK FOR CONTROLLING FIELD WEAKENING OF A PERMANENT MAGNET MOTOR

(71) Applicant: MILWAUKEE ELECTRIC TOOL CORPORATION, Brookfield, WI (US)

(72) Inventors: Jonathan E. Abbott, Wilmington, DE (US); Alexander T. Huber, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 156 days.

(21) Appl. No.: 18/738,561

(22) Filed: Jun. 10, 2024

(65) Prior Publication Data

US 2024/0399523 A1 Dec. 5, 2024

Related U.S. Application Data

(63) Continuation of application No. 17/732,192, filed on Apr. 28, 2022, now Pat. No. 12,005,540.
(Continued)

(51) Int. Cl.
*B23Q 15/12* (2006.01)
*G05B 13/02* (2006.01)

(52) U.S. Cl.
CPC ......... *B23Q 15/12* (2013.01); *G05B 13/0265* (2013.01)

(58) Field of Classification Search
None
See application file for complete search history.

(56) References Cited

U.S. PATENT DOCUMENTS 7,007,762 B2 3/2006 Yamamoto
7,821,217 B2 10/2010 Abolhassani et al.
(Continued)

FOREIGN PATENT DOCUMENTS

KR 20020072077 A 9/2002
WO WO2013136672 A1 9/2013
(Continued)

OTHER PUBLICATIONS

International Search Report and Written Opinion for Application No. PCT/US2022/026791 dated Aug. 9, 2022 (11 pages).
(Continued)

*Primary Examiner* — Ryan A Jarrett
(74) *Attorney, Agent, or Firm* — Michael Best & Friedrich LLP

(57) ABSTRACT

Power tools described herein include a housing, a motor supported by the housing, a battery pack configured to provide electrical power to the power tool, a user input configured to provide an input signal corresponding to a target speed of the motor, a plurality of sensors supported by the housing and configured to generate sensor data indicative of an operational parameter of the power tool, and an electronic controller. The electronic controller includes an electronic processor and a memory. The memory includes a machine learning control program for execution by the electronic processor. The electronic controller is configured to receive the target speed, receive the sensor data, process the sensor data using the machine learning control program, generate, using the machine learning control program, an output based on the sensor data, the output including one or more field weakening parameters, and control the motor based on the generated output.

20 Claims, 21 Drawing Sheets

Related U.S. Application Data

(60) Provisional application No. 63/180,823, filed on Apr. 28, 2021.

(56) References Cited

U.S. PATENT DOCUMENTS

| | | | |
|---|---|---|---|
| 8,373,371 | B2 | 2/2013 | Clothier et al. |
| 8,614,557 | B2 | 12/2013 | Clothier et al. |
| 8,847,532 | B2 | 9/2014 | Miyazaki et al. |
| 9,276,509 | B2 | 3/2016 | Kato et al. |
| 9,314,900 | B2 | 4/2016 | Vanko et al. |
| 9,406,915 | B2 | 8/2016 | White et al. |
| 9,438,141 | B2 | 9/2016 | Ishikawa et al. |
| 9,583,745 | B2 | 2/2017 | White et al. |
| 9,583,793 | B2 | 2/2017 | White et al. |
| 9,762,153 | B2 | 9/2017 | Forster et al. |
| 9,871,484 | B2 | 1/2018 | White et al. |
| 9,893,384 | B2 | 2/2018 | Velderman et al. |
| 10,050,572 | B2 | 8/2018 | Pant et al. |
| 10,056,582 | B2 | 8/2018 | White et al. |
| 10,099,303 | B2 | 10/2018 | Yoshida et al. |
| 10,177,701 | B2 | 1/2019 | White et al. |
| 10,193,111 | B2 | 1/2019 | Varipatis et al. |
| 10,193,422 | B2 | 1/2019 | Kouda et al. |
| 10,236,819 | B2 | 3/2019 | White et al. |
| 10,243,491 | B2 | 3/2019 | Cox et al. |
| 10,250,178 | B2 | 4/2019 | White et al. |
| 10,291,173 | B2 | 5/2019 | Cox et al. |
| 10,322,498 | B2 | 6/2019 | Ishikawa et al. |
| 10,333,453 | B2 | 6/2019 | Forster et al. |
| 10,333,454 | B2 | 6/2019 | Forster et al. |
| 10,361,651 | B2 | 7/2019 | White et al. |
| 10,411,558 | B2 | 9/2019 | Forster et al. |
| 10,469,006 | B2 | 11/2019 | Pant et al. |
| 10,541,639 | B2 | 1/2020 | White et al. |
| 10,608,574 | B2 | 3/2020 | White et al. |
| 10,615,733 | B2 | 4/2020 | Cox et al. |
| 10,658,903 | B2 | 5/2020 | Forster et al. |
| 2006/0113096 | A1 | 6/2006 | Yamamoto |
| 2012/0073846 | A1 | 3/2012 | Hirai et al. |
| 2012/0153881 | A1 | 6/2012 | Parenti et al. |
| 2016/0075004 | A1 | 3/2016 | Tsubakimoto et al. |
| 2017/0104243 | A1 | 4/2017 | Velderman et al. |
| 2017/0126051 | A1 | 5/2017 | Cox et al. |
| 2017/0214351 | A1 | 7/2017 | Lelkes et al. |
| 2017/0338753 | A1 | 11/2017 | Forster et al. |
| 2018/0090979 | A1 | 3/2018 | Forster et al. |
| 2018/0248507 | A1 | 8/2018 | Vanko et al. |
| 2019/0288632 | A1 | 9/2019 | Wang et al. |
| 2019/0341872 | A1 | 11/2019 | Cox et al. |
| 2019/0341873 | A1 | 11/2019 | Cox et al. |
| 2020/0036307 | A1 | 1/2020 | Pant |
| 2020/0036308 | A1 | 1/2020 | Pant |
| 2020/0162011 | A1 | 5/2020 | Cox et al. |
| 2020/0186006 | A1 | 6/2020 | Vanko et al. |
| 2020/0266743 | A1 | 8/2020 | Li et al. |

FOREIGN PATENT DOCUMENTS

| | | | | | |
|---|---|---|---|---|---|
| WO | WO2013136673 | A1 | | 9/2013 | |
| WO | WO2018198673 | A1 | | 11/2018 | |
| WO | WO2020017202 | A1 | | 1/2020 | |
| WO | WO-2021016437 | A1 | * | 1/2021 | ............. G06N 3/044 |

OTHER PUBLICATIONS

Dehkordi et al., "A comparative study of various intelligent based controllers for speed control of IPMSM drives in the field-weakening region," Expert Systems with Applications, 2011, 38(10): 12643-12653.
Peng Yanwu, "Computer Numerical Control (CNC) Systems," Northwestern Polytechnical University Press, May 1988, pp. 316-317 (7 pages including machine English translation).
Chinese Patent Office Action for Application No. 202280033536.6 dated Aug. 13, 2026 (25 pages including machine English translation).

* cited by examiner

900

POWER TOOL INCLUDING A MACHINE LEARNING BLOCK FOR CONTROLLING FIELD WEAKENING OF A PERMANENT MAGNET MOTOR

CROSS-REFERENCE TO RELATED APPLICATION

This application is a continuation of U.S. patent application Ser. No. 17/732,192, filed Apr. 28, 2022, which claims the benefit of U.S. Provisional Patent Application No. 63/180,823, filed Apr. 28, 2021, the entire content of each of which is hereby incorporated by reference.

FIELD

Embodiments described herein relate to power tool motor control.

SUMMARY

Embodiments described herein relate to power tools that control the advance angle and/or freewheel angle using a machine learning controller.

Power tools described herein include a housing, a motor supported by the housing, a battery pack supported by the housing and configured to provide electrical power to the power tool, a user input configured to provide an input signal corresponding to a target speed of the motor, a plurality of sensors supported by the housing and configured to generate sensor data indicative of an operational parameter of the power tool, and an electronic controller. The electronic controller includes an electronic processor and a memory. The memory includes a machine learning control program for execution by the electronic processor. The electronic controller is configured to receive the target speed, receive the sensor data, process the sensor data using the machine learning control program, generate, using the machine learning control program, an output based on the sensor data, the output including one or more field weakening parameters, and control the motor based on the generated output.

In one aspect, the machine learning control program is generated on an external system device through training based on example sensor data and associated outputs and is received by the power tool from the external system device.

In another aspect, the machine learning control program is one of a static machine learning control program and a trainable machine learning control program.

In another aspect, the sensor data includes one or more of a motor current, a battery pack impedance, a battery pack voltage, and a motion of the power tool.

In another aspect, the one or more field weakening parameters include one or more of an advance angle, a conduction angle, and a freewheel angle.

In another aspect, the electronic controller is configured to filter the field weakening parameters using one or more filters.

In another aspect, the one or more filters include one or more of a slew rate filter, a low pass filter, and a hysteresis filter.

In another aspect, the electronic controller is further configured to receive one or more priority parameter values, wherein the machine learning control program generates the output based on the sensor data and the priority parameter values.

Methods described herein for operating a power tool to control field weakening include generating, by a sensor of the power tool, sensor data indicative of an operational parameter of the power tool, and receiving, by an electronic controller of the power tool, the sensor data. The controller includes an electronic processor and a memory. The memory includes a machine learning control program for execution by the electronic processor. The methods further include processing the sensor data using a machine learning control program of the machine learning controller, generating, using the machine learning control program, an output based on the sensor data, the output including one or more field weakening parameters, and controlling, by the electronic controller, a motor of the power tool based on the output.

In one aspect, the machine learning control program is generated on an external system device based on example sensor data and associated outputs and is received by the power tool from the external system device.

In another aspect, the machine learning control program is one of a static machine learning control program and a trained machine learning control program.

In another aspect, the sensor data includes one or more of a motor current, a battery pack impedance, a battery pack voltage, and a motion of the power tool.

In another aspect, the one or more field weakening parameters include one or more of an advance angle, a conduction angle and a freewheel angle.

In another aspect, the method further includes filtering the one or more field weakening parameters using one or more filters.

In another aspect, the one or more filters include one or more of a slew rate filter, a low pass filter, and a hysteresis filter.

In another aspect, the method further includes receiving one or more parameter values via the electronic controller, and generating, by the machine learning control program, the output based on the sensor data and the priority parameter values.

Other power tools described herein include a housing, a motor supported by the housing, a battery pack supported by the housing and configured to provide electrical power to the power tool, a user input configured to provide an input signal corresponding to a target speed of the motor, a plurality of sensors supported by the housing and configured to generate sensor data indicative of an operational parameter of the power tool, and an electronic controller. The electronic controller includes an electronic processor and a memory. The memory includes a machine learning control program for execution by the electronic processor. The electronic controller is configured to receive the target speed, receive the sensor data, process the sensor data using the machine learning control program, generate, using the machine learning control program, one or more priority parameters based on the received target speed and the received sensor data. The electronic controller is further configured to generate an output based on the sensor data, the output including one or more field weakening parameters based on the one or more priority parameters and the received sensor data, and control the motor based on the generated output.

In some aspects, the one or more priority parameters include one or more of a speed control parameter, a maximum speed parameter, a maximum power parameter, and a maximum efficiency parameter.

In some aspects, the one or more field weakening parameters include one or more of an advance angle, a conduction angle, and a freewheel angle.

In some aspects, the electronic controller is also configured to filter the field weakening parameters using one or more filters, wherein the one or more filters include one or more of a slew rate filter, a low pass filter, and a hysteresis filter.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Some power tools include sensors and a control system that uses hard-corded thresholds to, for example, change or adjust the operation of the tool. For example, a sensor may detect that a battery voltage is below a predetermined, hard-coded threshold. The power tool may then cease operation of the motor to protect the battery pack. While these types of thresholds may be simple to implement and provide some benefit to the operation of a power tool, these types of hard-coded thresholds cannot adapt to changing conditions or applications during which the power tool is operated and may not ultimately be helpful in detecting and responding to more complicated conditions such as, for example, when the power tool experiences kickback.

The present application describes various systems in which a machine learning controller is utilized to control a feature or function of the power tool. For example, the machine learning controller, instead of implementing hard-coded thresholds determined and programmed by, for example, an engineer, detects conditions based on data collected during previous operations of the power tool. In some embodiments, the machine learning controller determines adjustable thresholds that are used to operate the tool based on, for example, a particular application of the power tool or during a particular mode of the power tool. Accordingly, the thresholds, conditions, or combinations thereof are based on previous operation of the same type of power tool and may change based on input received from the user and further operations of the power tool.

Figure 1:
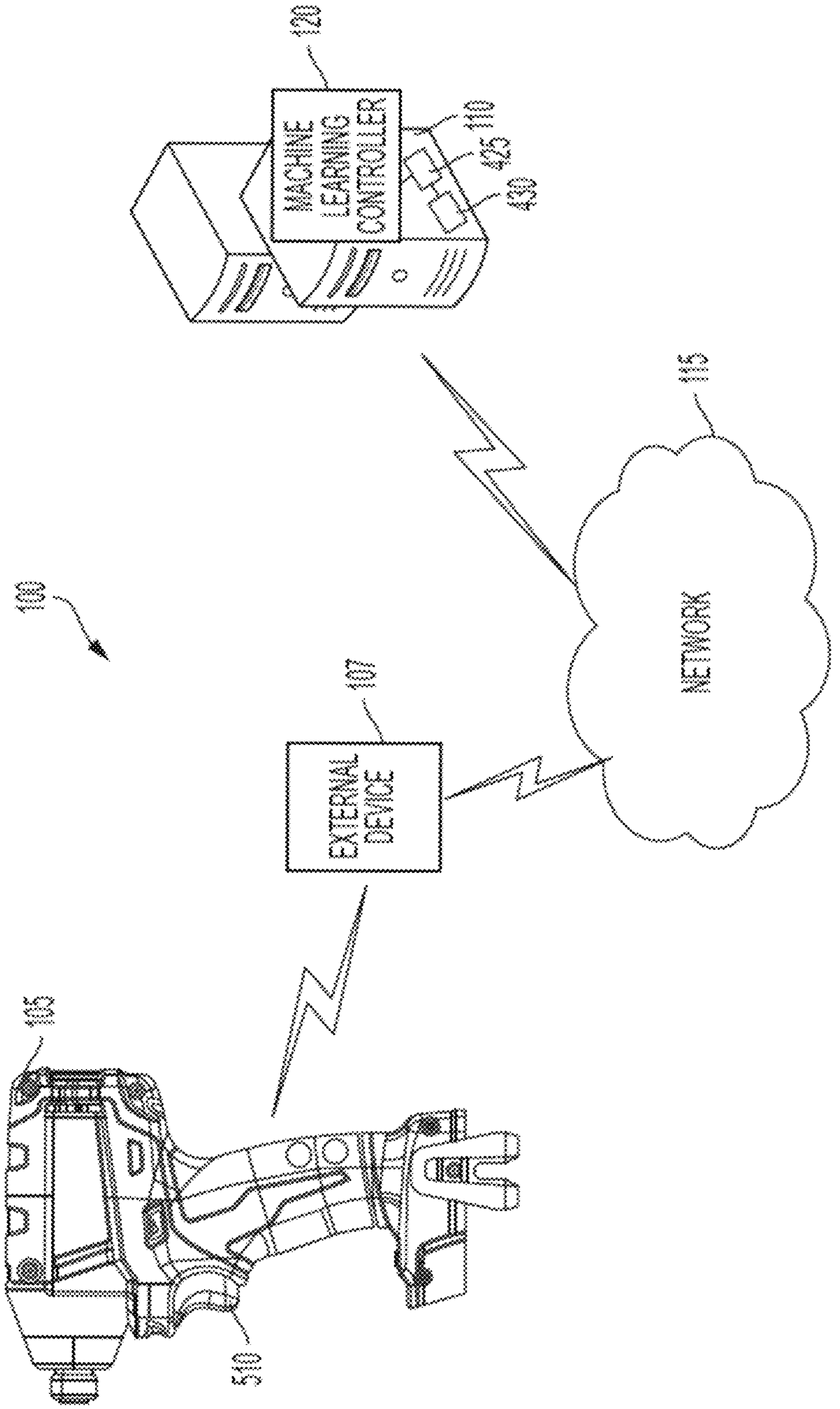
FIG. 1 illustrates a first power tool system.

FIG. 1 illustrates a first power tool system 100. The first power tool system 100 includes a power tool 105, an external device 107, a server 110, and a network 115. The power tool 105 includes various sensors and devices that collect usage information during the operation of the power tool 105. The usage information may alternatively be referred to as operational information of the power tool 105, and refers to, for example, data regarding the operation of the motor (e.g., speed, position, acceleration, temperature, usage time, and the like), the operating mode of the power tool 105 (e.g., driving mode, impact mode, operation time in each mode, frequency of operation in each mode, and the like), conditions encountered during operation (e.g., overheating of the motor, and the like), and other aspects (e.g., state of charge of the battery, rate of discharge, and the like).

In the illustrated embodiment, the power tool 105 communicates with the external device 107. The external device 107 may include, for example, a smart telephone, a tablet computer, a cellular phone, a laptop computer, a smart watch, and the like. The power tool 105 communicates with the external device 107, for example, to transmit at least a portion of the usage information for the power tool 105, to receive configuration information for the power tool 105, or a combination thereof. In some examples, the usage data may be taken from one or more sensors of the power tool 105, such as sensors 530 (FIG. 5) described below. For example, usage data may be based on dynamometer data associated with the power tool 105. In some embodiments, the external device may include a short-range transceiver to communicate with the power tool 105, and a long-range transceiver to communicate with the server 110. In the illustrated embodiment, the power tool 105 also includes a transceiver to communicate with the external device via, for example, a short-range communication protocol such as BLUETOOTH®. In some embodiments, the external device 107 bridges the communication between the power tool 105 and the server 110. That is, the power tool 105 transmits operational data to the external device 107, and the external device 107 forwards the operational data from the power tool 105 to the server 110 over the network 115. The network 115 may be a long-range wireless network such as the Internet, a local area network ("LAN"), a wide area network ("WAN"), or a combination thereof. In other embodiments, the network 115 may be a short-range wireless communication network, and in yet other embodiments, the network 115 may be a wired network using, for example, serial protocols (e.g., USB, USB-C, Firewire, and the like). Similarly, the server 110 may transmit information to the external device 107 to be forwarded to the power tool 105. In some embodiments, the power tool 105 is equipped with a long-range transceiver instead of or in addition to the short-range transceiver. In such embodiments, the power tool 105 communicates directly with the server 110. In some embodiments, the power tool 105 may communicate directly with both the server 110 and the external device 107. In such embodiments, the external device 107 may, for example, generate a graphical user interface to facilitate control and programming of the power tool 105, while the server 110 may store and analyze larger amounts of operational data for future programming or operation of the power tool 105. In other embodiments, however, the power tool 105 may communicate directly with the server 110 without utilizing a short-range communication protocol with the external device 107.

The server 110 includes a server electronic control assembly having a server electronic processor 425, a server memory 430, a transceiver, and a machine learning controller 120. The transceiver allows the server 110 to communicate with the power tool 105, the external device 107, or both. The server electronic processor 425 receives tool usage data from the power tool 105 (e.g., via the external device 107), stores the received tool usage data in the server memory 430, and, in some embodiments, uses the received tool usage data for building or adjusting a machine learning controller 120.

The machine learning controller 120 implements a machine learning program. The machine learning controller 120 is configured to construct a model (e.g., building one or more algorithms) based on example inputs. Supervised learning involves presenting a computer program with example inputs and their actual outputs (e.g., categorizations). The machine learning controller 120 is configured to learn a general rule or model that maps the inputs to the outputs based on the provided example input-output pairs. The machine learning algorithm may be configured to perform machine learning using various types of methods. For example, the machine learning controller 120 may implement the machine learning program using decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), attention networks/transformers, and others, such as those listed in Table 1 below.

TABLE 1

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning, Recurrent Transformers, etc. |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naïve Bayes, Transformers, etc. |

While Table 1 (above) describes model-based machine learning programs, it is understood that tabular-based machine learning programs, such as lookup tables, may be used as well. For example, tabular-based machine learning programs may be beneficial where the number of inputs to the machine learning controller 120 is limited.

The machine learning controller 120 is programmed and trained to perform a particular task. For example, in some embodiments, the machine learning controller 120 is trained to identify an application for which the power tool 105 is used (e.g., seating fasteners). The task for which the machine learning controller 120 is trained may vary based on, for example, the type of power tool, a selection from a user, typical applications for which the power tool is used, and the like. Analogously, the way in which the machine learning controller 120 is trained also varies based on the particular task. In particular, the training examples used to train the machine learning controller may include different information and may have different dimensions based on the task of the machine learning controller 120. In the example mentioned above in which the machine learning controller 120 is configured to identify a use application of the power tool 105, each training example may include a set of inputs such as motor speed, motor current and voltage, an operating mode currently being implemented by the power tool 105, and movement of the power tool 105 (e.g., from an accelerometer). Each training example also includes a specified output. For example, when the machine learning controller 120 identifies the use application of the power tool 105, a training example may have an output that includes a particular use application of the power tool 105, such as seating fasteners. Other training examples, including different values for each of the inputs and an output indicating that the use application is, for example, installing screws on a wooden workpiece. The training examples may be previously collected training examples, from for example, a plurality of the same type of power tools. For example, the training examples may have been previously collected from, for example, two hundred power tools of the same type (e.g., drills) over a span of, for example, one year. However, in other examples, training examples may be based on the use of a single power tool, such as power tool 105. In some embodiments, the machine learning controller 120 can sample a target parameter to see if a goal for the target parameter was achieved during use of the power tool 105.

A plurality of different training examples is provided to the machine learning controller 120. The machine learning controller 120 uses these training examples to generate a model (e.g., a rule, a set of equations, and the like) that helps categorize or estimate the output based on new input data. The machine learning controller 120 may weigh different training examples differently to, for example, prioritize different conditions or outputs from the machine learning controller 120. For example, a training example corresponding to a kickback condition may be weighted more heavily than a training example corresponding to a stripping condition to prioritize the correct identification of the kickback condition relative to the stripping condition. In some embodiments, the training examples are weighted differently by associating a different cost function or value to specific training examples or types of training examples.

In one example, the machine learning controller 120 implements an artificial neural network. The artificial neural network typically includes an input layer, a plurality of hidden layers or nodes, and an output layer. Typically, the input layer includes as many nodes as inputs provided to the machine learning controller 120. As described above, the number (and the type) of inputs provided to the machine learning controller 120 may vary based on the particular task for the machine learning controller 120. Accordingly, the input layer of the artificial neural network of the machine learning controller 120 may have a different number of nodes based on the particular task for the machine learning controller 120. The input layer connects to the hidden layers. The number of hidden layers varies and may depend on the particular task for the machine learning controller 120. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 120 but may also vary based on the specific type of hidden layer implemented.

Each hidden layer may perform a different function. For example, some hidden layers can be convolutional hidden layers which can, in some instances, reduce the dimensionality of the inputs, while other hidden layers can perform more statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs. In the example above in which the machine learning controller 120 identifies a use application of the power tool 105, the output layer may include, for example, four nodes. A first node may indicate that the use application corresponds to installing drywall, a second node may indicate that the use application corresponds to installing a screw on a wooden workpiece, a third node may indicate that the use application corresponds to removing a screw, and the fourth node may indicate that the use application corresponds to an unknown (or unidentifiable) task. In some embodiments, the machine learning controller 120 then selects the output node with the highest value and indicates to the power tool 105 or to the user the corresponding use application. In some embodiments, the machine learning controller 120 may also select more than one output node. The machine learning controller 120 or the electronic processor 550 may then use the multiple outputs to control the power tool 500. For example, the machine learning controller 120 may identify the type of fastener and select a self-drilling screw (e.g., a TEK screw) and a sheet metal screw as the most likely candidates for the fastener. The machine learning controller 120 or the electronic processor 550 may then, for example, control the motor according to the ramp up speed for a self-drilling screw, but adopt the kickback detection from the sheet metal screw. The machine learning controller 120 and the electronic processor 550 may implement different methods of combining the outputs from the machine learning controller 120.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights and/or biases associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, an optimized train vs. testing test, and the like. Different types of training algorithms can be used to adjust the bias values and the weights of the node connections based on the training examples. The training algorithms may include, for example, gradient descent, newton's method, conjugate gradient, quasi newton, Levenberg Marquardt, among others, see again Table 1.

In another example, the machine learning controller 120 implements a support vector machine to perform classification. The machine learning controller 120 may, for example, classify whether a fastener is stripping. In such embodiments, the machine learning controller 120 may receive inputs such as motor speed, output torque, and operation time (e.g., how long the power tool 105 has been working on the same fastener). The machine learning controller 120 then defines a margin using combinations of some of the input variables (e.g., motor speed, output torque, operation time, and the like) as support vectors to maximize the margin. In some embodiments, the machine learning controller 120 defines a margin using combinations of more than one of similar input variables (e.g., motion of a tool along different axes). The margin corresponds to the distance between the two closest vectors that are classified differently. For example, the margin corresponds to the distance between a vector representing a fastener that is stripping and a vector that represents a fastener that is not stripping. In some embodiments, the machine learning controller 120 uses more than one support vector machine to perform a single classification. For example, when the machine learning controller 120 classifies whether a fastener is stripping, a first support vector machine may determine whether the fastener is stripping based on the motor speed and the operation time, while a second support vector machine may determine whether the fastener is stripping based on the motor speed and the output torque. The machine learning controller 120 may then determine whether the fastener is stripping when both support vector machines classify the fastener as stripping. In other embodiments, a single support vector machine can use more than two input variables and define a hyperplane that separates those fasteners that are stripping from the fasteners that are not stripping.

The training examples for a support vector machine include an input vector including values for the input variables (e.g., motor speed, operation time, output torque, and the like), and an output classification indicating whether the fastener represents a fastener that is stripping. During training, the support vector machine selects the support vectors (e.g., a subset of the input vectors) that maximize the margin. In some embodiments, the support vector machine may be able to define a line or hyperplane that accurately separates the fasteners that are stripping from those that are not stripping. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data (e.g., to determine whether the fastener is stripping). In other embodiments, as mentioned above, the machine learning controller 120 can implement different machine learning algorithms to make an estimation or classification based on a set of input data.

Some examples of input data, processing technique, and machine learning algorithm pairings are listed below in Table 2. The input data, listed as time series data in the below table, includes, for example, one or more of the various examples of time-series tool usage information described herein.

TABLE 2

| Input Data | Data Processing | Exemplary Model |
|---|---|---|
| Time Series Data | N/A | RNN (using LSTM) (e.g., for screw stripping indication); DNN/CNN/RNN (e.g., LSTM, GRU) |
| Time Series Data | Filtering (e.g., low-pass filters) | DNN/CNN/RNN (e.g., STM, GRU) classifier/regression (e.g., for screw seating detection), or another non-recurrent algorithm |
| Time Series Data | Sliding window, padding, or data subset | DNN classifier/regression (e.g., for screw seating detection), or another non-recurrent algorithm |
| Time Series Data | Make features (e.g., summarize analysis of runtime data) | KNN or another non-recurrent or recurrent algorithm |
| Time Series Data | Initial (e.g., pre-trained) model | Model adaptation |
| Time Series Data | Initial RNN or DNN analysis for classification | Markov Model (for likely tool application determination during or between tool operations) |
| Time Series Data | Segmented Time and/or Features of Impacts or Pulses | DNN, CNN, RNN, Recurrent Regression, Attention Network (e.g., for use in torque prediction) |

In the example of FIG. 1, the server 110 receives usage information from the power tool 105. In some embodiments, the server 110 uses the received usage information as additional training examples (e.g., when the actual value or classification is also known). In other embodiments, the server 110 sends the received usage information to the trained machine learning controller 120. The machine learning controller 120 then generates an estimated value or classification based on the input usage information. The server electronic processor 425 then generates recommendations for future operations of the power tool 105. For example, the trained machine learning controller 120 may determine that the fastener is seating. The server electronic processor 425 may then determine that a slower motor speed for the selected operating mode may be used to prevent the fastener from being over tightened or seated. The server 110 may then transmit the suggested operating parameters to the external device 107. The external device 107 may display the suggested changes to the operating parameters and request confirmation from the user to implement the suggested changes before forwarding the changes on to the power tool 105. In other embodiments, the external device 107 forwards the suggested changes to the power tool 105 and displays the suggested changes to inform the user of changes implemented by the power tool 105. The server 110 may be on-premises server, a cloud-based server, a personal computer, a laptop, an end-of-line fixture (e.g., dynamometer) for testing a given power tool 105, or another computing device capable of performing the functions of the server 110.

In particular, in the embodiment illustrated in FIG. 1, the server electronic control assembly generates a set of parameters and updated thresholds recommended for the operation of the power tool 105 in particular modes. For example, the machine learning controller 120 may detect that, during various operations of the power tool 105 in the impacting mode, the power tool 105 could have benefitted from a faster average rotation speed of the motor during the first ten seconds of operation. The machine learning controller 120 may then adjust a motor speed threshold of an impacting mode such that the motor speed during the first ten seconds of the impacting mode of the power tool 105 is increased. The server 110 then transmits the updated motor speed threshold to the power tool 105 via the external device 107.

The power tool 105 receives the updated motor speed threshold, updates the impacting mode according to the updated motor speed threshold, and operates according to the updated motor speed threshold when in the impacting mode. In some embodiments, the power tool 105 periodically transmits the usage data to the server 110 based on a predetermined schedule (e.g., every eight hours). In other embodiments, the power tool 105 transmits the usage data after a predetermined period of inactivity (e.g., when the power tool 105 has been inactive for two hours), which may indicate that a session of operation has been completed. In some embodiments, the power tool 105 transmits the usage data in real time to the server 110 and may implement the updated thresholds and parameters in subsequent operations.

Figure 2:
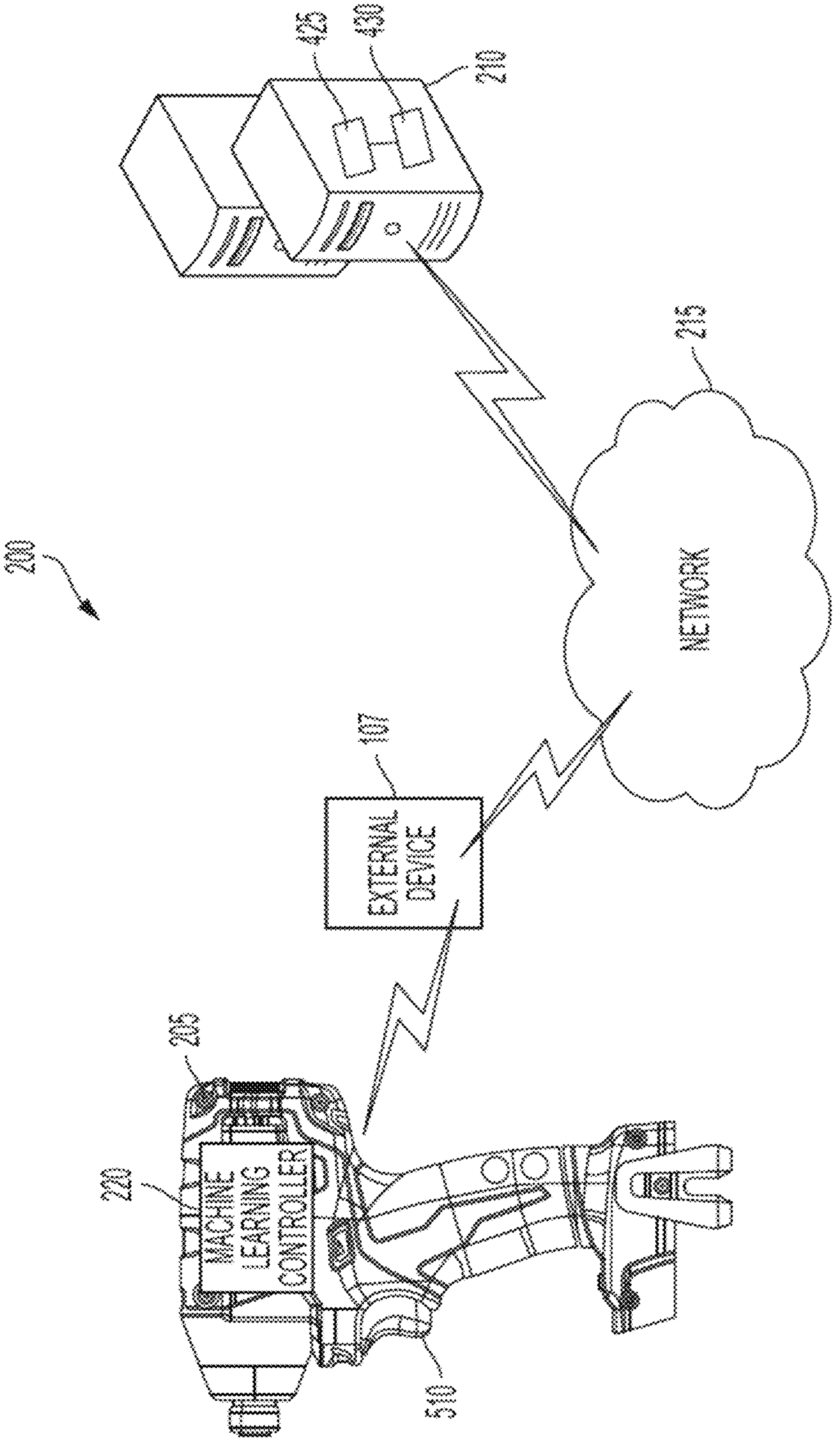
FIG. 2 illustrates a second power tool system.

FIG. 2 illustrates a second power tool system 200. The second power tool system 200 includes a power tool 205, the external device 107, a server 210, and a network 215. The power tool 205 is similar to that of the power tool system 100 of FIG. 1 and collects similar usage information as that described with respect to FIG. 1. Unlike the power tool 105 of the first power tool system 100, the power tool 205 of the second power tool system 200 includes a static machine learning controller 220. In the illustrated embodiment, the power tool 205 receives the static machine learning controller 220 from the server 210 over the network 215. In some embodiments, the power tool 205 receives the static machine learning controller 220 during manufacturing, while in other embodiments, a user of the power tool 205 may select to receive the static machine learning controller 220 after the power tool 205 has been manufactured and, in some embodiments, after operation of the power tool 205. The static machine learning controller 220 is a trained machine learning controller similar to the trained machine learning controller 120 in which the machine learning controller 120 has been trained using various training examples and is configured to receive new input data and generate an estimation or classification for the new input data.

The power tool 205 communicates with the server 210 via, for example, the external device 107 as described above with respect to FIG. 1. The external device 107 may also provide additional functionality (e.g., generating a graphical user interface) to the power tool 205. The server 210 of the power tool system 200 may utilize usage information from power tools similar to the power tool 205 (for example, when the power tool 205 is a drill, the server 210 may receive usage information from various other drills) and trains a machine learning program using training examples from the received usage information from the power tools. The server 210 then transmits the trained machine learning program to the machine learning controller 220 of the power tool 205 for execution during future operations of the power tool 205.

Accordingly, the static machine learning controller 220 includes a trained machine learning program provided, for example, at the time of manufacture. During future operations of the power tool 205, the static machine learning controller 220 analyzes new usage data from the power tool 205 and generates recommendations or actions based on the new usage data. As discussed above with respect to the machine learning controller 120, the static machine learning controller 220 has one or more specific tasks such as, for example, determining a current application of the power tool 205. In other embodiments, the task of the static machine learning controller 220 may be different. In some embodiments, a user of the power tool 205 may select a task for the static machine learning controller 220 using, for example, a graphical user interface generated by the external device 107. The external device 107 may then transmit the target task for the static machine learning controller 220 to the server 210. The server 210 then transmits a trained machine learning program, trained for the target task, to the static machine learning controller 220. Based on the estimations or classifications from the static machine learning controller 220, the power tool 205 may change its operation, adjust one of the operating modes of the power tool 205, and/or adjust a different aspect of the power tool 205. In some embodiments, the power tool 205 may include more than one static machine learning controller 220, each having a different target task.

Figure 3:
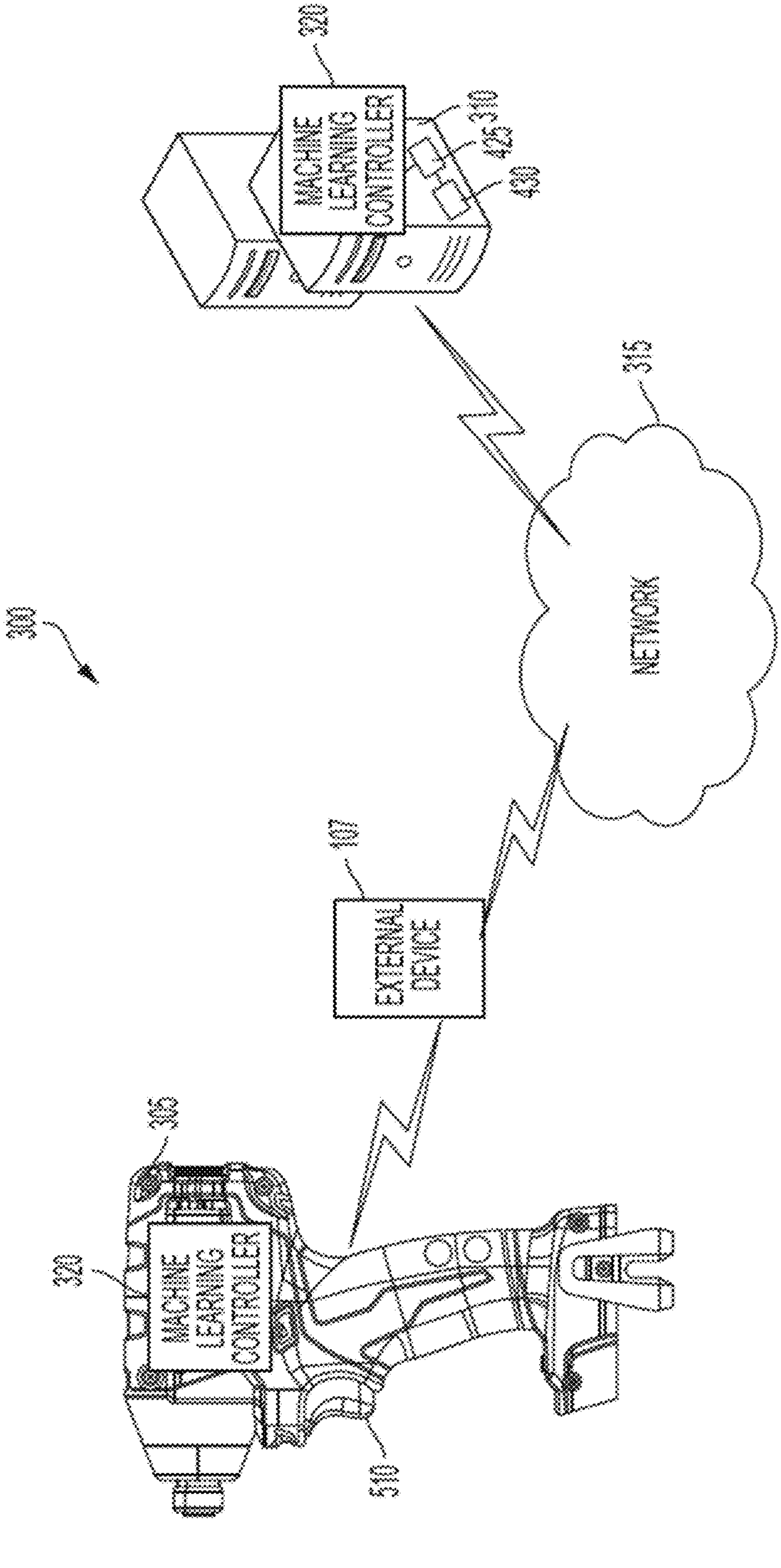
FIG. 3 illustrates a third power tool system.

FIG. 3 illustrates a third power tool system 300. The third power tool system 300 also includes a power tool 305, an external device 107, a server 310, and a network 315. The power tool 305 is similar to the power tools 105, 205 described above and includes similar sensors that monitor various types of usage information of the power tool 305 (e.g., motor speed, output torque, type of battery pack, state of charge of battery pack, and the like). The power tool 305 of the third power tool system 300, however, includes an adjustable machine learning controller 320 instead of the static machine learning controller 220 of the second power tool 205. In the illustrated embodiment, the adjustable machine learning controller 320 of the power tool 305 receives the machine learning program from the server 310 over the network 315. Unlike the static machine learning controller 220 of the second power tool 205, the server 310 may transmit updated versions of the machine learning program to the adjustable machine learning controller 320 to replace previous versions.

The power tool 305 of the third power tool system 300 transmits feedback to the server 310 (via, for example, the external device 107) regarding the operation of the adjustable machine learning controller 320. The power tool 305, for example, may transmit an indication to the server 310 regarding the number of operations that were incorrectly classified by the adjustable machine learning controller 320. The server 310 receives the feedback from the power tool 305, updates the machine learning program, and provides the updated program to the adjustable machine learning controller 320 to reduce the number of operations that are incorrectly classified. Thus, the server 310 updates or re-trains the adjustable machine learning controller 320 in view of the feedback received from the power tool 305. In some embodiments, the server 310 also uses feedback received from similar power tools to adjust the adjustable machine learning controller 320. In some embodiments, the server 310 updates the adjustable machine learning controller 320 periodically (e.g., every month). In other embodiments, the server 310 updates the adjustable machine learning controller 320 when the server 310 receives a predetermined number of feedback indications (e.g., after the server 310 receives two feedback indications). The feedback indications may be positive (e.g., indicating that the adjustable machine learning controller 320 correctly classified a condition, event, operation, or combination thereof), or the feedback may be negative (e.g., indicating that the adjustable machine learning controller 320 incorrectly classified a condition, event, operation, or combination thereof). In some examples, the feedback indications may be numerical (e.g., achieved torque value) or categorical (unseated, seated, stripped).

In some embodiments, the server 310 also utilizes usage data and/or sensor data (raw or processed) received from the power tool 305 and other similar power tools to update the adjustable machine learning controller 320. For example, the server 310 may periodically re-train (or adjust the training) of the adjustable machine learning controller 320 based on the newly received usage data. The server 310 then transmits an updated version of the adjustable machine learning controller 320 to the power tool 305.

When the power tool 305 receives the updated version of the adjustable machine learning controller 320 (e.g., when an updated machine learning program is provided to and stored on the machine learning controller 320), the power tool 305 replaces the current version of the adjustable machine learning controller 320 with the updated version. In some embodiments, the power tool 305 is equipped with a first version of the adjustable machine learning controller 320 during manufacturing. In such embodiments, the user of the power tool 305 may request newer versions of the adjustable machine learning controller 320. In some examples, implementation of updates, and/or use of the machine learning functionality may be provided via a subscription, purchase, and/or lease. In some embodiments, the user may select a frequency with which the adjustable machine learning controller 320 is transmitted to the power tool 305. In other examples, the operation or mode use of the power tool 305 may be disabled until a newer version of the machine learning controller 320 has been established on the power tool 305, and/or a calibration step of the machine learning controller 320 and/or power tool 305 is performed.

Figure 4A:
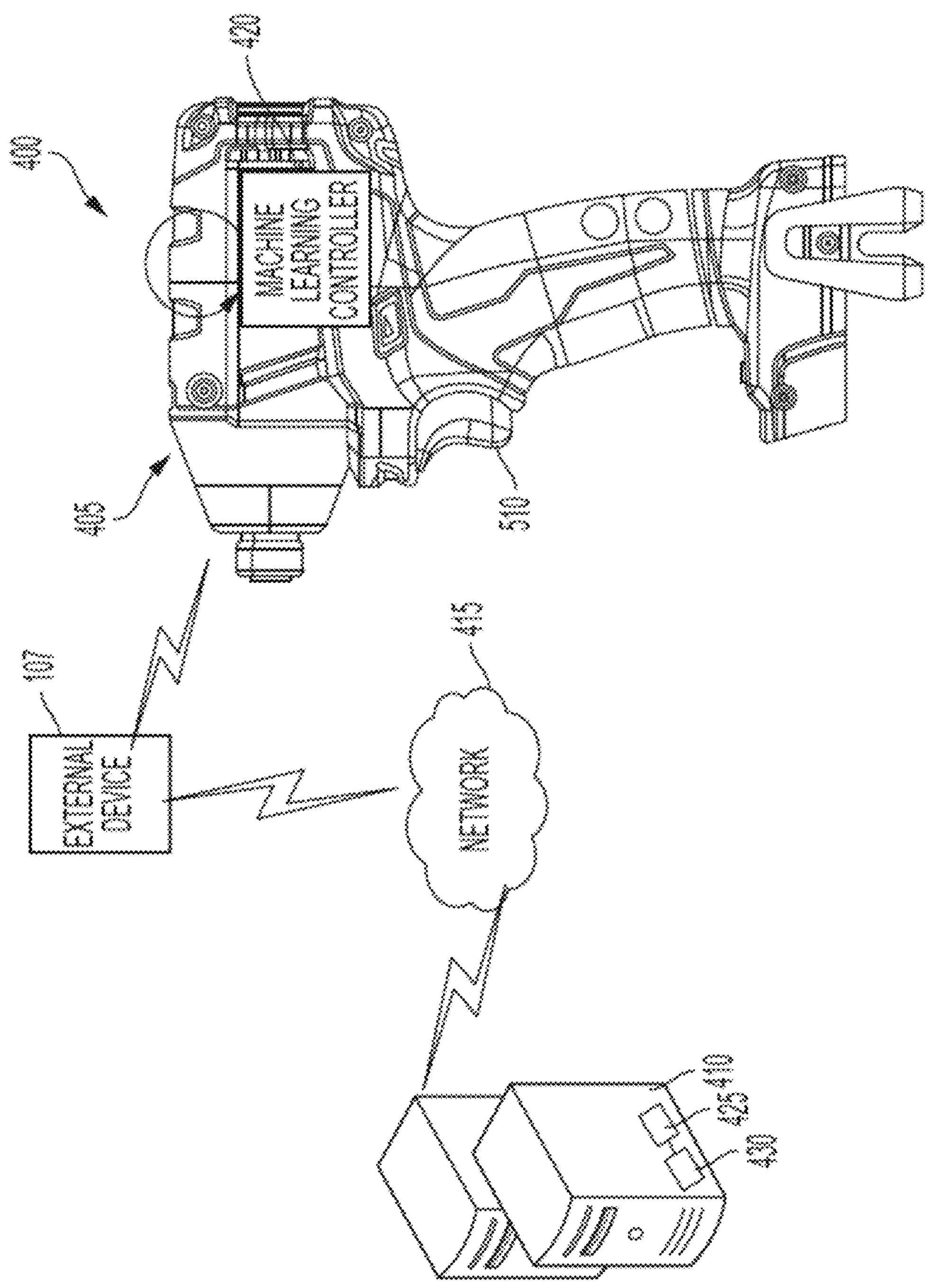
FIGS. 4A-B illustrate a fourth power tool system.

FIG. 4A illustrates a fourth power tool system 400. The fourth power tool system 400 includes a power tool 405, an external device 107, a network 415, and a server 410. The power tool 405 includes a self-updating machine learning controller 420. The self-updating machine learning controller 420 is first loaded on the power tool 405 during, for example, manufacturing. The self-updating machine learning controller 420 updates itself. In other words, the self-updating machine learning controller 420 receives new usage information from the sensors in the power tool 405, feedback information indicating desired changes to operational parameters (e.g., user wants to increase motor speed or output torque), feedback information indicating whether the classification made by the machine learning controller 420 is incorrect, or a combination thereof. The self-updating machine learning controller 420 then uses the received information to re-train the self-updating machine learning controller 420.

In some embodiments, the power tool 405 re-trains the self-updating machine learning controller 420 when the power tool 405 is not in operation. For example, the power tool 405 may detect when the motor has not been operated for a predetermined time period and start a re-training process of the self-updating machine learning controller 420 while the power tool 405 remains non-operational. Training the self-updating machine learning controller 420 while the power tool 405 is not operating allows more processing power to be used in the re-training process instead of competing for computing resources typically used to operate the power tool 405.

As shown in FIG. 4A, in some embodiments, the power tool 405 also communicates with the external device 107 and a server 410. For example, the external device 107 communicates with the power tool 405 as described above with respect to FIGS. 1-3. The external device 107 generates a graphical user interface to facilitate the adjustment of operational parameters of the power tool 405. The external device 107 may also bridge the communication between the power tool 405 and the server 410. For example, as described above with respect to FIG. 2, in some embodiments, the external device 107 receives a selection of a target task for the machine learning controller 420. The external device 107 may then request a corresponding machine learning program from the server 410 for transmitting to the power tool 405. The power tool 405 also communicates with the server 410 (e.g., via the external device 107). In some embodiments, the server 410 may also re-train the self-updating machine learning controller 420, for example, as described above with respect to FIG. 3. The server 410 may use additional training examples from other similar power tools. Using these additional training examples may provide greater variability and ultimately make the machine learning controller 420 more reliable. In some embodiments, the power tool 405 re-trains the self-updating machine learning controller 420 when the power tool 405 is not in operation, and the server 410 may re-train the machine learning controller 420 when the power tool 405 remains in operation (for example, while the power tool 405 is in operation during a scheduled re-training of the machine learning controller 420). Accordingly, in some embodiments, the self-updating machine learning controller 420 may be re-trained on the power tool 405, by the server 410, or with a combination thereof. In some embodiments, the server 410 does not re-train the self-updating machine learning controller 420, but still exchanges information with the power tool 405. For example, the server 410 may provide other functionality for the power tool 405 such as, for example, transmitting information regarding various operating modes for the power tool 405.

Each of FIGS. 1-4A describes a power tool system 100, 200, 300, 400 in which a power tool 105, 205, 305, 405 communicates with a server 110, 210, 310, 410 and with an external device 107. As discussed above with respect to FIG. 1, the external device 107 may bridge communication between the power tool 105, 205, 305, 405 and the server 110, 210, 310, 410. That is, the power tool 105, 205, 305, 405 may communicate directly with the external device 107. The external device 107 may then forward the information received from the power tool 105, 205, 305, 405 to the server 110, 210, 310, 410. Similarly, the server 110, 210, 310, 410 may transmit information to the external device 107 to be forwarded to the power tool 105, 205, 305, 405. In such embodiments, the power tool 105, 205, 305, 405 may include a transceiver to communicate with the external device 107 via, for example, a short-range communication protocol such as BLUETOOTH®. The external device 107 may include a short-range transceiver to communicate with the power tool 105, 205, 305, 405, and may also include a long-range transceiver to communicate with the server 110, 210, 310, 410. In some embodiments, a wired connection (via, for example, a USB cable) is provided between the external device 107 and the power tool 105, 205, 405 to enable direct communication between the external device 107 and the power tool 105, 205, 305, 405. Providing the wired connection may provide a faster and more reliable communication method between the external device 107 and the power tool 105, 205, 305, 405.

The external device 107 may include, for example, a smart telephone, a tablet computer, a cellular phone, a laptop computer, a smart watch, and the like. The server 110, 210, 310, 410 illustrated in FIGS. 1-4A includes at least a server electronic processor 425, a server memory 430, and a transceiver to communicate with the power tool 105, 205, 305, 405 via the network 115, 215, 315, 415. The server electronic processor 425 receives tool usage data from the power tool 105, 205, 305, 405, stores the tool usage data in the server memory 430, and, in some embodiments, uses the received tool usage data for building or adjusting the machine learning controller 120, 220, 320, 420. The term external system device may be used herein to refer to one or more of the external device 107 and the server 110, 210, 310, and 410, as each are external to the power tool 105, 205, 305, 405. Further, in some embodiments, the external system device is a wireless hub, such as a beaconing device place on a jobsite to monitor tools, function as a gateway network device (e.g., providing Wi-Fi® network), or both. As described herein, the external system device includes at least an input/output unit (e.g., a wireless or wired transceiver) for communication, a memory storing instructions, and an electronic processor to execute instructions stored on the memory to carry out the functionality attributed to the external system device.

Figure 4B:
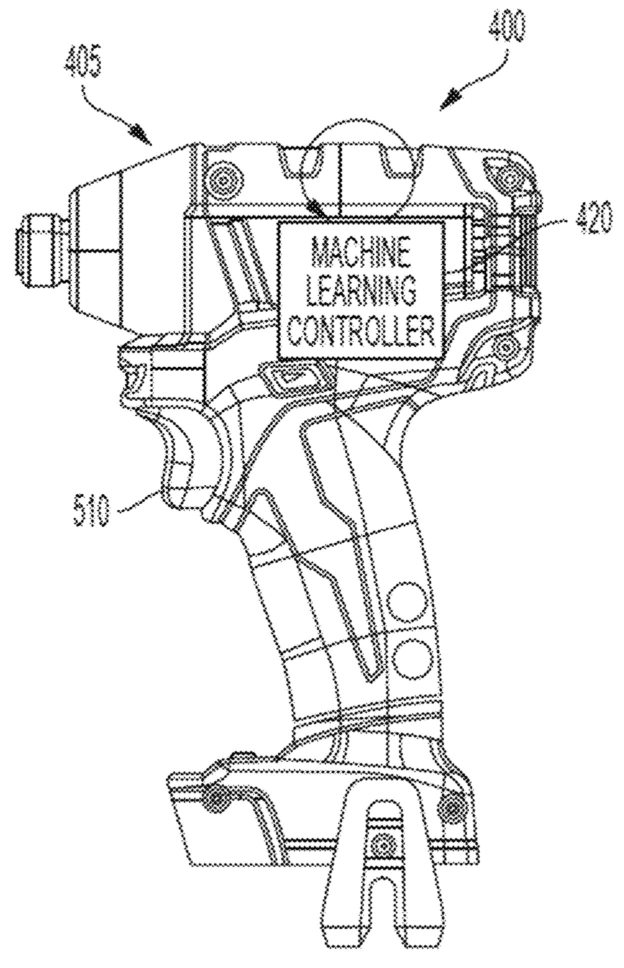

In some embodiments, the power tool 405 may not communicate with the external device 107 or the server 410. For example, FIG. 4B illustrates the power tool 405 with no connection to the external device 107 or the server 410. Rather, since the power tool 405 includes the self-updating machine learning controller 420, the power tool 405 can implement the machine learning controller 420, receive user feedback, and update the machine learning controller 420 without communicating with the external device 107 or the server 410.

Figure 4C:
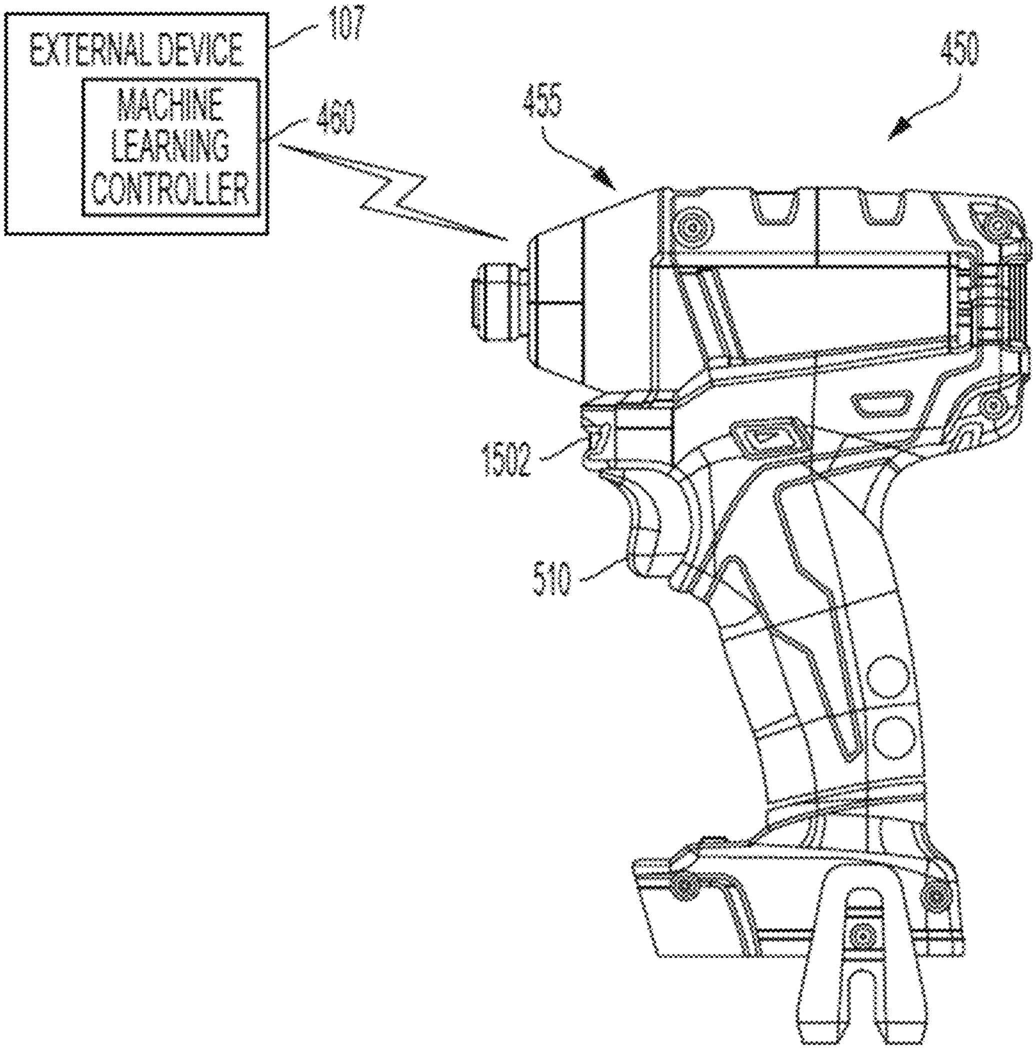
FIG. 4C illustrates a fourth power tool system.

FIG. 4C illustrates a fifth power tool system 450 including a power tool 455 and the external device 107. The external device 107 communicates with the power tool 455 using the various methods described above with respect to FIGS. 1-4A. In particular, the power tool 455 transmits operational data regarding the operation of the power tool 455 to the external device 107. The external device 107 generates a graphical user interface to facilitate the adjustment of operational parameters of the power tool 455 and to provide information regarding the operation of the power tool 455 to the user. In the illustrated embodiment of FIG. 4C, the external device 107 includes a machine learning controller 460. In some embodiments, the machine learning controller 460 is similar to the machine learning controller 120 of FIG. 1. In such embodiments, the machine learning controller 460 receives the usage information from the power tool 455 and generates recommendations for future operations of the power tool 455. The machine learning controller 460 may, in such embodiments, generate a set of parameters and updated threshold recommended for the operation of the power tool 105 in particular modes. The external device 107 then transmits the updated set of parameters and updated thresholds to the power tool 455 for implementation.

In some embodiments, the machine learning controller 460 is similar to the machine learning controller 320 of FIG. 3. In such embodiments, the external device 107 may update the machine learning controller 460 based on, for example, feedback received from the power tool 455 and/or other operational data from the power tool 455. In such embodiments, the power tool 455 also includes a machine learning controller similar to, for example, the adjustable machine learning controller 320 of FIG. 3. The external device 107 can then modify and update the adjustable machine learning controller 320 and communicate the updates to the machine learning controller 320 to the power tool 455 for implementation. For example, the external device 107 can use the feedback from the user to retrain the machine learning controller 460, to continue training a machine learning controller 460 implementing a reinforcement learning control, or may, in some embodiments, use the feedback to adjust a switching rate on a recurrent neural network for example.

In some embodiments, as discussed briefly above, the power tool 455 also includes a machine learning controller. The machine learning controller of the power tool 455 may be similar to, for example, the static machine learning controller 220 of FIG. 2, the adjustable machine learning controller 320 of FIG. 3 as described above, or the self-updating machine learning controller 420 of FIG. 4A.

Figure 4D:
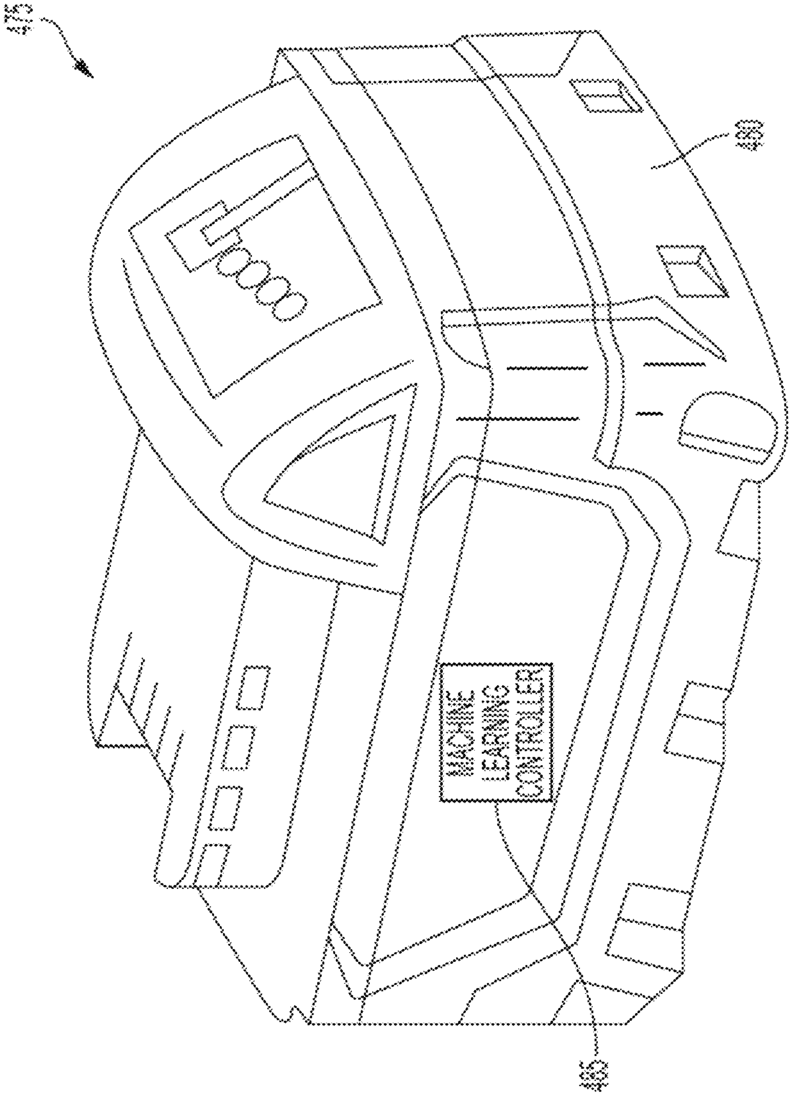
FIG. 4D illustrates a fifth power tool system.

FIG. 4D illustrates a sixth power tool system 475 including a battery pack 480. The battery pack 480 includes a machine learning controller 485. Although not illustrated, the battery pack 480 may, in some embodiments, communicate with the external device 107, a server, or a combination thereof through, for example, a network. Alternatively, or in addition, the battery pack may communicate with a power tool 455, such as a power tool 455 attached to the battery pack 480. The external device 107 and the server may be similar to the external device 107 and server 110, 210, 310, 410 described above with respect to FIGS. 1-4A. The machine learning controller 485 of the battery pack 480 may be similar to any of the machine learning controllers 220, 320, 420 described above. In one embodiment, the machine learning controller 220, 320, 420 controls operation of the battery pack 480. For example, the machine learning controller 485 may help identify different battery conditions that may be detrimental to the battery pack 480 and may automatically change (e.g., increase or decrease) the amount of current provided by the battery pack 480, and/or may change some of the thresholds that regulate the operation of the battery pack 480. For example, the battery pack 480 may, from instructions of the machine learning controller 485, reduce power to inhibit overheating of the battery cells. In some embodiments, the battery pack 480 communicates with a power tool (e.g., similar to the power tool 105, 205, 305, 405, 455) and the machine learning controller 485 controls at least some aspects and/or operations of the power tool. For example, the battery pack 480 may receive usage data (e.g., sensor data) from the power tool and generate outputs to control the operation of the power tool. The battery pack 480 may then transmit the control outputs to the electronic processor of the power tool.

In still other embodiments, a power system including a charger (e.g., for charging the battery pack 480 or a similar battery pack without a machine learning controller) is provided, wherein the charger includes a machine learning controller similar to those described herein. In some embodiments, an adapter configured to be positioned between the battery pack 480 and the power tool, such as power tool 305, can include a machine learning controller, which can control the power tool.

FIGS. 1-4C illustrate example power tools in the form of an impact driver 105, 205, 305, 405. The particular power tools 105, 205, 305, 405 illustrated and described herein, however, are merely representative. In other embodiments, the power tool systems 100, 200, 300, 400 described herein may include different types of power tools such as, for example, a power drill, a hammer drill, a powered screw driver, a screw gun, a powered ratchet, a powered torque wrench, a hydraulic pulse tool, an impact driver, an impact wrench, a reaction arm tool, a tension control gun or driver, a pipe cutter, a sander, a nailer, a grease gun, a string trimmer, a lawn mower, a mud mixer, a pressure washer, blowers, jackhammers, and the like. A power tool 105, 205, 305, 405 of the power tool systems 100, 200, 300, 400 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool. Each power tool includes a drive device specifically designed for the primary function of the power tool. For example, in the illustrated embodiments in which the power tool corresponds to an impact driver, the drive device is a socket. In embodiments, however, where the power tool is, for example, a power drill, the drive device may include an adjustable chuck as a bit driver.

Each of FIGS. 1-4D illustrate various embodiments in which different types of machine learning controllers 120, 220, 320, 420 are used in conjunction with the power tool 105, 205, 305, 405. In some embodiments, each power tool 105, 205, 305, 405 may include more than one machine learning controller 120, 220, 320, 420, and each machine learning controller 120, 220, 320, 420 may be of a different type. For example, a power tool 105, 205, 305, 405 may include a static machine learning controller 220 as described with respect to FIG. 2 and may also include a self-updating machine learning controller 420 as described with respect to FIG. 4A. In another example, the power tool 105, 205, 305, 405 may include a static machine learning controller 220. The static machine learning controller 220 may be subsequently removed and replaced by, for example, an adjustable machine learning controller 320. In other words, the same power tool may include any of the machine learning controllers 120, 220, 320, 420 described above with respect to FIGS. 1-4B. Additionally, a machine learning controller 540, shown in FIG. 6 and described in further detail below, is an example controller that may be used as one or more of the machine learning controllers 120, 220, 320, 420, 460, and 485.

Figure 5A:
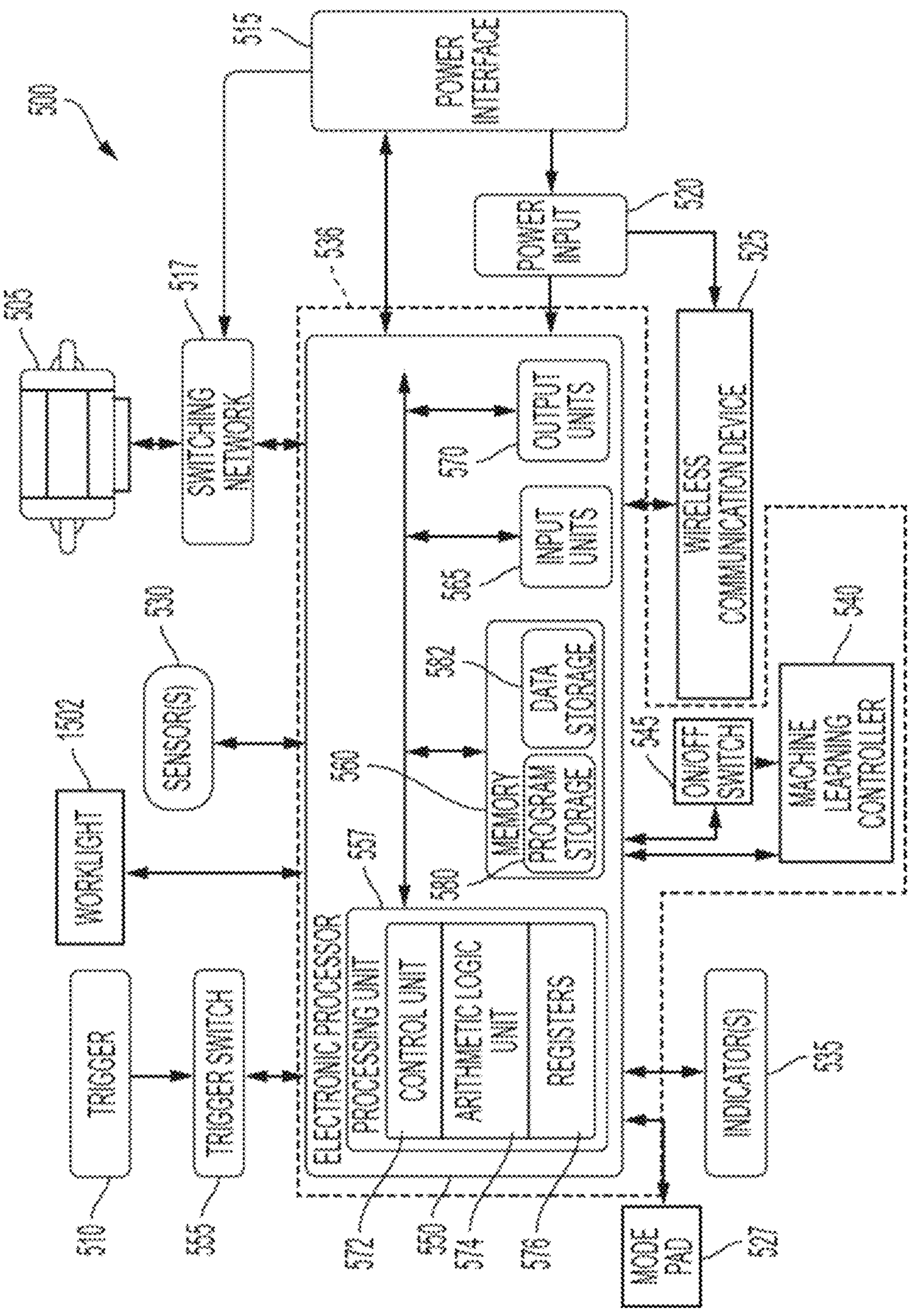
FIG. 5A is a block diagram of an example power tool of the power tool systems of FIGS. 1-4C.

FIG. 5A is a block diagram of a representative power tool 500 in the form of an impact driver and including a machine learning controller. Similar to the example power tools of FIGS. 1-4C, the power tool 500 is representative of various types of power tools. Accordingly, the description with respect to the power tool 500 is similarly applicable to other types of power tools. The machine learning controller of the power tool 500 may be a static machine learning controller similar to the static machine learning controller 220 of the second power tool 205, an adjustable machine learning controller similar to the adjustable machine learning controller 320 of the third power tool 305, or a self-updating machine learning controller similar to the self-updating machine learning controller 420 of the fourth power tool 405. Although the power tool 500 of FIG. 5A is described as being in communication with the external device 107 or with a server, in some embodiments, the power tool 500 is self-contained or closed, in terms of machine learning, and does not need to communicate with the external device 107 or the server to perform the functionality of the machine learning controller 540 described in more detail below.

As shown in FIG. 5A, the power tool 500 includes a motor 505, a trigger 510, a power interface 515, a switching network 517, a power input control 520, a wireless communication device 525, a mode pad 527, a plurality of sensors 530, a plurality of indicators 535, and an electronic control assembly 536. The electronic control assembly 536 includes a machine learning controller 540, an activation switch 545, and an electronic processor 550. The motor 505 actuates the drive device of the power tool 500 and allows the drive device to perform the particular task for the power tool 500. The motor 505 receives power from an external power source through the power interface 515. In one embodiment, the motor 505 is a permanent magnet motor, such as a brushless DC motor ("BLDC"). In some embodiment, the external power source includes an AC power source. In such embodiments, the power interface 515 includes an AC power cord that is connectable to, for example, an AC outlet. In other embodiments, the external power source includes a battery pack. In such embodiments, the power interface 515 includes a battery pack interface. The battery pack interface may include a battery pack receiving portion on the power tool 500 that is configured to receive and couple to a battery pack (e.g., the battery pack or a similar battery pack without machine learning controller). The battery pack receiving portion may include a connecting structure to engage a mechanism that secures the battery pack and a terminal block to electrically connect the battery pack to the power tool 500.

The motor 505 is energized based on a state of the trigger 510. Generally, when the trigger 510 is activated, the motor 505 is energized, and when the trigger 510 is deactivated, the motor is de-energized. In some embodiments, such as the power tools 105, 205, 305, 405 illustrated in FIGS. 1-4C, the trigger 510 extends partially down a length of the handle of the power tool and is moveably coupled to the handle such that the trigger 510 moves with respect to the power tool housing. In the illustrated embodiment, the trigger 510 is coupled to a trigger switch 555 such that when the trigger 510 is depressed, the trigger switch 555 is activated, and when the trigger is released, the trigger switch 555 is deactivated. In the illustrated embodiment, the trigger 510 is biased (e.g., with a biasing member such as a spring) such that the trigger 510 moves in a second direction away from the handle of the power tool 500 when the trigger 510 is released by the user. In other words, the default state of the trigger switch 555 is to be deactivated unless a user presses the trigger 510 and activates the trigger switch 555.

The switching network 517 enables the electronic processor 550 to control the operation of the motor 505. The switching network 517 includes a plurality of electronic switches (e.g., FETs, bipolar transistors, and the like) connected together to form a network that controls the activation of the motor 505 using a pulse-width modulated (PWM)

signal. For instance, the switching network 217 may include a six-FET bridge that receives pulse-width modulated (PWM) signals from the electronic processor 550 to drive the motor 505. Generally, when the trigger 510 is depressed as indicated by an output of the trigger switch 555, electrical current is supplied from the power interface 515 to the motor 505 via the switching network 517. When the trigger 510 is not depressed, electrical current is not supplied from the power interface 515 to the motor 505. As discussed in more detail below, in some embodiments, the amount of trigger pull detected by the trigger switch 555 is related to or corresponds to a desired speed of rotation of the motor 505. In other embodiments, the amount of trigger pull corresponds to a desired torque.

In response to the electronic processor 550 receiving the activation signal from the trigger switch 555, the electronic processor 550 activates the switching network 517 to provide power to the motor 505. The switching network 517 controls the amount of current available to the motor 505 and thereby controls the speed and torque output of the motor 505. The mode pad 527 allows a user to select a mode of the power tool 500 and indicates to the user the currently selected mode of the power tool 500. In some embodiments, the mode pad 527 includes a single actuator. In such embodiments, a user may select an operating mode for the power tool 500 based on, for example, a number of actuations of the mode pad 527. For example, when the user activates the actuator three times, the power tool 500 may operate in a third operating mode. In other embodiments, the mode pad 527 includes a plurality of actuators, each actuator corresponding to a different operating mode. For example, the mode pad 527 may include four actuators, when the user activates one of the four actuators, the power tool 500 may operate in a first operating mode. The electronic processor 550 receives a user selection of an operating mode via the mode pad 527 and controls the switching network 517 such that the motor 505 is operated according to the selected operating mode. In some embodiments, the power tool 500 does not include a mode pad 527. In such embodiments, the power tool 500 may operate in a single mode or may include a different selection mechanism for selecting an operation mode for the power tool 500. In some embodiments, as described in more detail below, the power tool 500 (e.g., the electronic control assembly 536) automatically selects an operating mode for the power tool 500 using, for example, the machine learning controller 540.

The sensors 530 are coupled to the electronic processor 550 and communicate to the electronic processor 550 various output signals indicative of different parameters of the power tool 500 or the motor 505. The sensors 530 include, for example, Hall Effect sensors, motor current sensors, motor voltage sensors, temperature sensors, torque sensors, position, or movement sensors such as accelerometers or gyroscopes, and the like. The Hall Effect sensors output motor feedback information to the electronic processor 550 such as an indication (e.g., a pulse) related to the motor's position, velocity, and acceleration of the rotor of the motor 505. In some embodiments, the electronic processor 550 uses the motor feedback information from the Hall Effect sensors to control the switching network 517 to drive the motor 505. For example, by selectively enabling and disabling the switching network 517, power is selectively provided to the motor 505 to cause rotation of the motor at a specific speed, a specific torque, or a combination thereof. The electronic processor 550 may also control the operation of the switching network 517 and the motor 505 based on other sensors included in the power tool 500. For example, in some embodiments, the electronic processor 550 changes the control signals based on a sensor output signal indicating a number of impacts delivered by the power tool 500, a sensor output signal indicating a speed of the anvil of the power tool 500, and the like. In other examples, back emf voltages may be measured using one or more sensors to derive motor position during operation of the power tool 105 (e.g., "sensorless position detection"). The output signals from the sensors are used to ensure proper timing of control signals to the switching network 517 and, in some instances, to provide closed-loop feedback to control the speed of the motor 505 to be within a target range or at a target level.

The indicators 535 are also coupled to the electronic processor 550. The indicators 535 receive control signals from the electronic processor 550 to generate a visual signal to convey information regarding the operation or state of the power tool 500 to the user. The indicators 535 may include, for example, LEDs or a display screen and may generate various signals indicative of, for example, an operational state or mode of the power tool 500, an abnormal condition or event detected during the operation of the power tool 500, and the like. For example, the indicators 535 may indicate measured electrical characteristics of the power tool 500, the state or status of the power tool 500, an operating mode of the power tool 500 (discussed in further detail below), and the like. In some embodiments, the indicators 535 include elements to convey information to a user through audible or tactile outputs. In some embodiments, the power tool 500 does not include the indicators 535. In some embodiments, the operation of the power tool 500 alerts the user regarding a power tool condition. For example, a fast deceleration of the motor 505 may indicate that an abnormal condition is present. In some embodiments, the power tool 500 communicates with the external device 107, and the external device 107 generates a graphical user interface that conveys information to the user without the need for indicators 535 on the power tool 500 itself.

The power interface 515 is coupled to the power input control 520. The power interface 515 transmits the power received from the external power source to the power input control 520. The power input control 520 includes active and/or passive components (e.g., voltage step-down controllers, voltage converters, rectifiers, filters, etc.) to regulate or control the power received through the power interface 515 to the electronic processor 550 and other components of the power tool 500 such as the wireless communication device 525.

The wireless communication device 525 is coupled to the electronic processor 550. In the example power tools 105, 205, 305, 405 of FIGS. 1-4A and 4C, the wireless communication device 525 is located near the foot of the power tool 105, 205, 305, 405 (see FIGS. 1-4) to save space and ensure that the magnetic activity of the motor 505 does not affect the wireless communication between the power tool 500 and the server 110, 210, 310, 410 or with an external device 107. In a particular example, the wireless communication device 525 is positioned under the mode pad 527. The wireless communication device 525 may include, for example, a radio transceiver and antenna, a memory, a processor, and a real-time clock. The radio transceiver and antenna operate together to send and receive wireless messages to and from the external device 107, a second power tool 500, or the server 110, 210, 310, 410 and the processor. The memory of the wireless communication device 525 stores instructions to be implemented by the processor and/or may store data related to communications between the power tool 500 and the external device 107, a second power tool 500, or the server 110, 210, 310, 410. The processor for the wireless communication device 525 controls wireless communications between the power tool 500 and the external device 107, a second power tool 500, or the server 110, 210, 310, 410. For example, the processor of the wireless communication device 525 buffers incoming and/or outgoing data, communicates with the electronic processor 550, and determines the communication protocol and/or settings to use in wireless communications.

In some embodiments, the wireless communication device 525 is a Bluetooth® controller. The Bluetooth® controller communicates with the external device 107, a second power tool 500, or server 110, 210, 310, 410 employing the Bluetooth® protocol. In such embodiments, therefore, the external device 107, a second power tool 500, or server 110, 210, 310, 410 and the power tool 500 are within a communication range (i.e., in proximity) of each other while they exchange data. In other embodiments, the wireless communication device 525 communicates using other protocols (e.g., Wi-Fi, cellular protocols, a proprietary protocol, etc.) over a different type of wireless network. For example, the wireless communication device 525 may be configured to communicate via Wi-Fi through a wide area network such as the Internet or a local area network, or to communicate through a piconet (e.g., using infrared or NFC communications). The communication via the wireless communication device 525 may be encrypted to protect the data exchanged between the power tool 500 and the external device 107, a second power tool 500, or server 110, 210, 310, 410 from third parties.

In some embodiments, the wireless communication device 525 includes a real-time clock (RTC). The RTC increments and keeps time independently of the other power tool components. The RTC receives power from the power interface 515 when an external power source is connected to the power tool 500 and may receive power from a back-up power source when the external power source is not connected to the power tool 500. The RTC may time stamp the operational data from the power tool 500. Additionally, the RTC may enable a security feature in which the power tool 500 is disabled (e.g., locked-out and made inoperable) when the time of the RTC exceeds a lockout time determined by the user.

The wireless communication device 525, in some embodiments, exports tool usage data, maintenance data, mode information, drive device information, and the like from the power tool 500 (e.g., from the power tool electronic processor 550). The exported data may indicate, for example, when work was accomplished, and that work was accomplished to specification. The exported data can also provide a chronological record of work that was performed, track duration of tool usage, and the like. The server 110, 210, 310, 410 receives the exported information, either directly from the wireless communication device 525 or through an external device 107, and logs the data received from the power tool 500. As discussed in more detail below, the exported data can be used by the power tool 500, the external device 107, or the server 110, 210, 310, 410 to train or adapt a machine learning controller relevant to similar power tools. The wireless communication device 525 may also receive information from the server 110, 210, 310, 410, the external device 107, or a second power tool 500, such as configuration data, operation threshold, maintenance threshold, mode configurations, programming for the power tool 500, updated machine learning controllers for the power tool 500, and the like. For example, the wireless communication device 525 may exchange information with a second power tool 500 directly, or via an external device 107.

In some embodiments, the power tool 500 does not communicate with the external device 107 or with the server 110, 210, 310, 410 (e.g., power tool 405 in FIG. 4B). Accordingly, in some embodiments, the power tool 500 does not include the wireless communication device 525 described above. In some embodiments, the power tool 500 includes a wired communication interface to communicate with, for example, the external device 107 or a different device (e.g., another power tool 500). The wired communication interface may provide a faster communication route than the wireless communication device 525.

In some embodiments, the power tool 500 includes a data sharing setting. The data sharing setting indicates what data, if any, is exported from the power tool 500 to the server 110, 210, 310, 410. In one embodiment, the power tool 500 receives (e.g., via a graphical user interface generated by the external device 107) an indication of the type of data to be exported from the power tool 500. In one embodiment, the external device 107 may display various options or levels of data sharing for the power tool 500, and the external device 107 receives the user's selection via its generated graphical user interface. For example, the power tool 500 may receive an indication that only usage data (e.g., motor current and voltage, number of impacts delivered, torque associated with each impact, and the like) is to be exported from the power tool 500, but may not export information regarding, for example, the modes implemented by the power tool 500, the location of the power tool 500, and the like. In some embodiments, the data sharing setting may be a binary indication of whether or not data regarding the operation of the power tool 500 (e.g., usage data) is transmitted to the server 110, 210, 310, 410. The power tool 500 receives the user's selection for the data sharing setting and stores the data sharing setting in memory to control the communication of the wireless communication device 525 according to the selected data sharing setting.

The electronic control assembly 536 is electrically and/or communicatively connected to a variety of modules or components of the power tool 500. The electronic assembly 536 controls the motor 505 based on the outputs and determinations from the machine learning controller 540. In particular, the electronic control assembly 136 includes the electronic processor 550 (also referred to as an electronic controller), the machine learning controller 540, and the corresponding activation switch 545. In some embodiments, the electronic processor 550 includes a plurality of electrical and electronic components that provide power, operational control, and protection to the components and modules within the electronic processor 550 and/or power tool 500. For example, the electronic processor 550 includes, among other things, a processing unit 557 (e.g., a microprocessor, a microcontroller, or another suitable programmable device), a memory 560, input units 565, and output units 570. The processing unit 557 includes, among other things, a control unit 572, an arithmetic logic unit ("ALU") 574, and a plurality of registers 576. In some embodiments, the electronic processor 550 is implemented partially or entirely on a semiconductor (e.g., a field-programmable gate array ["FPGA"] semiconductor) chip or an Application Specific Integrated Circuit ("ASIC"), such as a chip developed through a register transfer level ("RTL") design process.

The memory 560 includes, for example, a program storage area 580 and a data storage area 582. The program storage area 580 and the data storage area 582 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 560 and executes software instructions that are capable of being stored in a RAM of the memory 560 (e.g., during execution), a ROM of the memory 560 (e.g., on a generally permanent basis), or another non-transitory computer readable medium such as another memory or a disc. Software included in the implementation of the power tool 500 can be stored in the memory 560 of the electronic processor 550. The software includes, for example, firmware, one or more applications, program data, filters, rules, one or more program modules, and other executable instructions. In some embodiments, the machine learning controller 540 may be stored in the memory 560 of the electronic processor 550 and are executed by the processing unit 557.

The electronic processor 550 is configured to retrieve from memory 560 and execute, among other things, instructions related to the control processes and methods described herein. The electronic processor 550 is also configured to store power tool information on the memory 560 including tool usage information, information identifying the type of tool, a unique identifier for the particular tool, user characteristics (e.g., identity, trade type, skill level), and other information relevant to operating or maintaining the power tool 500 (e.g., received from an external source, such as the external device 107 or pre-programed at the time of manufacture). The tool usage information, such as current levels, motor speed, motor acceleration, motor direction, number of impacts, may be captured or inferred from data output by the sensors 530. More particularly, Table 3 shows example types of tool usage information which may be captured or inferred by the electronic processor 550. In other constructions, the electronic processor 550 includes additional, fewer, or different components.

TABLE 3

| Type of data | Time-series data | Non-time-series data |
|---|---|---|
| Raw data | Trigger, current, voltage, speed, torque, temperature, motion, timing between events (ex: impacts) etc. | Duration, date, time, time, time since last use, mode, clutch setting, direction, battery type, presence of side-handle, errors, history of past applications and switching rate, user input, external inputs, gear etc. |
| Derived features | Filtered values of raw data, fast Fourier transforms (FFTs), subsampled/pooled data, fitted parameters (ex: polynomial fits), PCA, features generated by encoder [decoder] networks, derived features (ex: estimated energy, momentum, inertia of system), derivatives/integrals/functions/accumulators of parameters, padded data, sliding window of data, etc. | Principal component analysis (PCA), features generated by encoder [decoder] networks, likelihood matrix of application/history, functions of inputs, etc. |

The machine learning controller 540 is coupled to the electronic processor 550 and to the activation switch 545. The activation switch 545 switches between an activated state and a deactivated state. When the activation switch 545 is in the activated state, the electronic processor 550 is in communication with the machine learning controller 540 and receives decision outputs from the machine learning controller 540. When the activation switch 545 is in the deactivated state, the electronic processor 550 is not in communication with the machine learning controller 540. In other words, the activation switch 545 selectively enables and disables the machine learning controller 540. As described above with respect to FIGS. 1-4D, the machine learning controller 540 includes a trained machine learning controller that utilizes previously collected power tool usage data to analyze and classify new usage data from the power tool 500. As explained in more detail below, the machine learning controller 540 can identify conditions, applications, and states of the power tool. In one embodiment, the activation switch 545 switches between an activated state and a deactivated state. In such embodiments, while the activation switch 545 is in the activated state, the electronic processor 550 controls the operation of the power tool 500 (e.g., changes the operation of the motor 505) based on the determinations from the machine learning controller 540. Otherwise, when the activation switch 545 is in the deactivated state, the machine learning controller 540 is disabled and the machine learning controller 540 does not affect the operation of the power tool 500. In some embodiments, however, the activation switch 545 switches between an activated state and a background state. In such embodiments, when the activation switch 545 is in the activated state, the electronic processor 550 controls the operation of the power tool 500 based on the determinations or outputs from the machine learning controller 540. However, when the activation switch 545 is in the background state, the machine learning controller 540 continues to generate output based on the usage data of the power tool 500 and may calculate (e.g., determine) thresholds or other operational levels, but the electronic processor 550 does not change the operation of the power tool 500 based on the determinations and/or outputs from the machine learning controller 540. In other words, in such embodiments, the machine learning controller 540 operates in the background without affecting the operation of the power tool 500. In some embodiments, the activation switch 545 is not included on the power tool 500 and the machine learning controller 540 is maintained in the enabled state or is controlled to be enabled and disabled via, for example, wireless signals from the server (e.g., servers 110, 210, 310, 410) or from the external device 107.

Figure 5B:
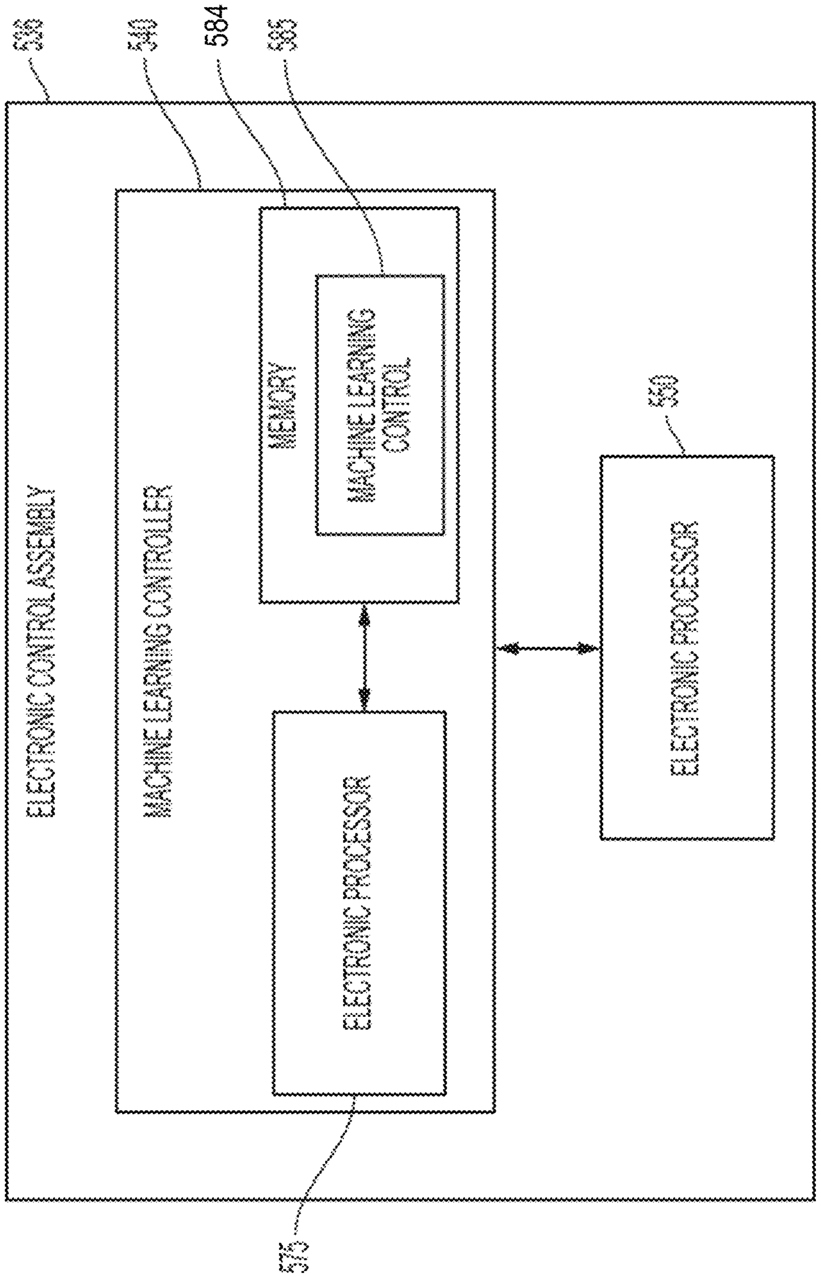
FIG. 5B is a block diagram of a machine learning controller of the power tool of FIG. 5A.

As shown in FIG. 5B, the machine learning controller 540 includes an electronic processor 575 and a memory 584. The memory 584 stores a machine learning control 585. The machine learning control 585 may include a trained machine learning program as described above with respect to FIGS. 1-4D. In the illustrated embodiment, the electronic processor 575 includes a graphics processing unit. In the embodiment of FIG. 5B, the machine learning controller 540 is positioned on a separate printed circuit board (PCB) as the electronic processor 550 of the power tool 500. The PCB of the electronic processor 550 and the machine learning controller 540 are coupled with, for example, wires or cables to enable the electronic processor 550 of the power tool 500 to control the motor 505 based on the outputs and determinations from the machine learning controller 540. In other embodiments, however, the machine learning control 585 may be stored in memory 560 of the electronic processor 550 and may be implemented by the processing unit 557. In such embodiments, the electronic control assembly 536 includes a single electronic processor 550. In yet other embodiments, the machine learning controller 540 is implemented in the separate electronic processor 575 but is positioned on the same PCB as the electronic processor 550 of the power tool 500. Embodiments with the machine learning controller 540 implemented as a separate processing unit from the electronic processor 550, whether on the same or different PCBs, allows selecting a processing unit to implement each of the machine learning controller 540 and the electronic processor 550 that has its capabilities (e.g., processing power and memory capacity) tailored to the particular demands of each unit. Such tailoring can reduce costs and improve efficiencies of the power tools. In some embodiments, as illustrated in FIG. 4C, for example, the external device 107 includes the machine learning controller 540 and the power tool 500 communicates with the external device 107 to receive the estimations or classifications from the machine learning controller 540. In some embodiments, the machine learning controller 540 is implemented in a plug-in chip or controller that is easily added to the power tool 500. For example, the machine learning controller 540 may include a plug-in chip that is received within a cavity of the power tool 500 and connects to the electronic processor 550. For example, in some embodiments, the power tool 500 includes a lockable compartment including electrical contacts that is configured to receive and electrically connect to the plug-in machine learning controller 540. The electrical contacts enable bidirectional communication between the plug-in machine learning controller 540 and the electronic processor 550 and enable the plug-in machine learning controller 540 to receive power from the power tool 500.

Figure 6:
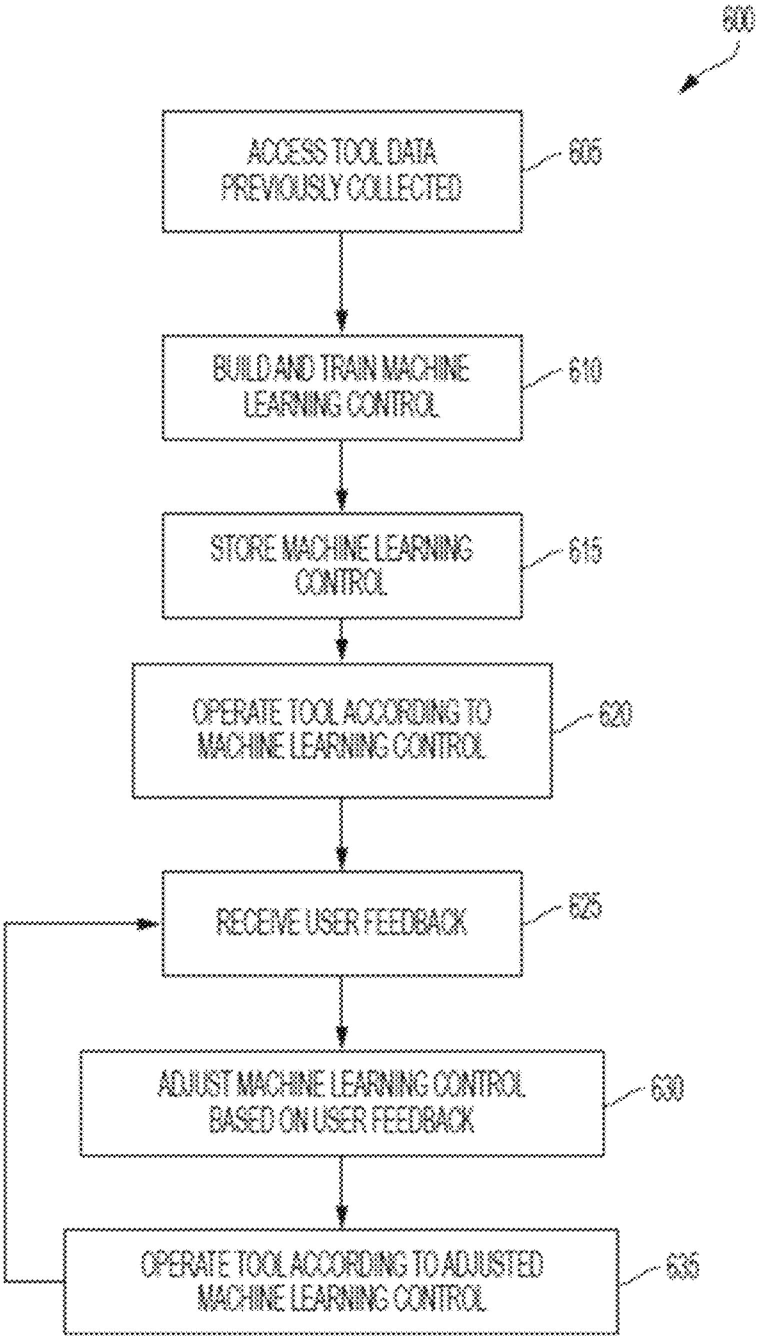
FIG. 6 is a flowchart illustrating a method of building and implementing a machine learning controller for the power tool of FIG. 5A.

As discussed above with respect to FIG. 1, the machine learning control 585 may be built and operated by the server 110. In other embodiments, the machine learning control 585 may be built by the server 110 but implemented by the power tool 500 (similar to FIGS. 2 and 3), and in yet other embodiments, the power tool 500 (e.g., the electronic processor 550, electronic processor 575, or a combination thereof) builds and implements the machine learning control 585 (similar to FIG. 4B). FIG. 6 illustrates a method 600 of building and implementing the machine learning control 585. The method 600 is described with respect to power tool 500, but, as previously described with respect to FIG. 5, the power tool 500 is representative of the power tools 105, 205, 305, 405 described in the respective systems of FIGS. 1-4C. Accordingly, a similar method may be implemented by the power tool 105, 205, 305, 405 of the respective systems of FIGS. 1-4D. In step 605, the server electronic processor 425 accesses tool usage information previously collected from similar power tools. Additionally, the server electronic processor 425 accesses user characteristic information, such as characteristic information of a user using a respective power tool at a time the power tool is collecting tool usage information. For example, to build the machine learning control 585 for the impact drivers of FIGS. 1-4C and 5A, the server electronic processor 425 accesses tool usage data previously collected from other impact drivers (e.g., via the network 115). The tool usage data includes, for example, motor current, motor voltage, motor position and/or velocity, usage time, battery state of charge, position of the power tool, position or velocity of the output shaft, number of impacts, and the like. Additionally, the server electronic processor 425 accesses user characteristic information previously collected (e.g., via the network 115). The server electronic processor 425 then proceeds to build and train the machine learning control 585 based on the tool usage data, the user characteristic information, or both (step 610).

Building and training the machine learning control 585 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Training the machine learning control 585 includes providing training examples to the machine learning control 585 and using one or more algorithms to set the various weights, margins, or other parameters of the machine learning control 585 to make reliable estimations or classifications.

In some embodiments, building and training the machine learning control 585 includes building and training a recurrent neural network. Recurrent neural networks allow analysis of sequences of inputs instead of treating every input individually. That is, recurrent neural networks can base their determination or output for a given input not only on the information for that particular input, but also on the previous inputs. For example, when the machine learning control 585 is configured to identify a type of fastener used with the power tool 500, the machine learning control 585 may determine that since the last three operations used lug nuts, the fourth operation is also likely to use a lug nut. Using recurrent neural networks helps compensate for some of the misclassifications the machine learning control 585 would make by providing and taking account the context around a particular operation. Accordingly, when implementing a recurrent neural network, the learning rate affects not only how each training example affects the overall recurrent neural network (e.g., adjusting weights, biases, and the like), but also affects how each input affects the output of the next input.

The server electronic processor 425 builds and trains the machine learning control 585 to perform a particular task. For example, in some embodiments, the machine learning control 585 is trained to identify an application for which the power tool 500 is used (e.g., for seating fasteners). In other embodiments, the machine learning control 585 is trained to detect when a detrimental condition is present or eminent (e.g., detecting kickback). The task for which the machine learning control 585 is trained may vary based on, for example, the type of power tool 500, a selection from a user, typical applications for which the power tool is used, user characteristic information, and the like. FIGS. 12-17 expand on examples of particular tasks for which the machine learning control 585 is built and trained. The server electronic processor 425 uses different tool usage data to train the machine learning control 585 based on the particular task.

In some embodiments, the particular task for the machine learning controller 540 (e.g., for the machine learning control 585) also defines the particular architecture for the machine learning control 585. For example, for a first set of tasks, the server electronic processor 425 may build a support vector machine, while, for a second set of tasks, the server electronic processor 425 may build a neural network. In some embodiments, each task or type of task is associated with a particular architecture. In such embodiments, the server electronic processor 425 determines the architecture for the machine learning control 585 based on the task and the machine learning architecture associated with the particular task.

After the server electronic processor builds and trains the machine learning control 585, the server electronic processor 425 stores the machine learning control 585 in, for example, the memory 430 of the server 110 (step 615). The server electronic processor 425, additionally or alternatively, transmits the trained machine learning control 585 to the power tool 500. In such embodiments, the power tool 500 stores the machine learning control 585 in the memory 560 of the machine learning controller 540. In some embodiments, for example, when the machine learning control 585 is implemented by the electronic processor 550 of the power tool 500, the power tool 500 stores the machine learning control 585 in the memory 560 of the electronic control assembly 536.

Once the machine learning control 585 is stored, the power tool 500 operates the motor 505 according to (or based on) the outputs and determinations from the machine learning controller 540 (step 620). In embodiments in which the machine learning controller 540 (including the machine learning control 585) is implemented in the server 110, 210, the server 110, 210 may determine operational thresholds from the outputs and determinations from the machine learning controller 540. The server 110, 210 then transmits the determined operational thresholds to the power tool 500 to control the motor 505.

The performance of the machine learning controller 540 depends on the amount and quality of the data used to train the machine learning controller 540. Accordingly, if insufficient data is used (e.g., by the server 110, 210, 310, 410) to train the machine learning controller 540, the performance of the machine learning controller 540 may be reduced. Alternatively, different users may have different preferences and may operate the power tool 500 for different applications and in a slightly different manner (e.g., some users may press the power tool 500 against the work surface with a greater force, some may prefer a faster finishing speed, and the like). These differences in usage of the power tool 500 may also compromise some of the performance of the machine learning controller 540 from the perspective of a user.

Optionally, to improve the performance of the machine learning controller 540, in some embodiments, the server electronic processor 425 receives feedback from the power tool 500 (or the external device 107) regarding the performance of the machine learning controller 540 (step 625). In other words, at least in some embodiments, the feedback is with regard to the control of the motor from the earlier step 620. In other embodiments, however, the power tool 500 does not receive user feedback regarding the performance of the machine learning controller 540 and instead continues to operate the power tool 500 by executing the machine learning control 585. As explained in further detail below, in some embodiments, the power tool 500 includes specific feedback mechanism for providing feedback on the performance of the machine learning controller 540. In some embodiments, the external device 107 may also provide a graphical user interface that receives feedback from a user regarding the operation of the machine learning controller 540. The external device 107 then transmits the feedback indications to the server electronic processor 425. In some embodiments, the power tool 500 may only provide negative feedback to the server 110, 210, 310, 410 (e.g., when the machine learning controller 540 performs poorly).

In some embodiments, the server 110, 210, 310, 410 may consider the lack of feedback from the power tool 500 (or the external device 107) to be positive feedback indicating an adequate performance of the machine learning controller 540. In some embodiments, the power tool 500 receives, and provides to the server electronic processor 425, both positive and negative feedback. In some embodiments, in addition or instead of user feedback (e.g., directly input to the power tool 500), the power tool 500 senses one or more power tool characteristics via one or more sensors 530, and the feedback is based on the sensed power tool characteristic(s). For example, on a torque wrench embodiment of the power tool 500, the torque wrench includes a torque sensor to sense output torque during a fastener operation, and the sensed output torque is provided as feedback. The feedback from the torque sensor can directly provide feedback to itself to prevent overshooting target torque during rundown and seating of a fastener. Alternatively, a sensor on a different power tool may be used (e.g., a separate powered torque wrench) to provide feedback.

The sensed output torque (e.g., feedback) may be evaluated locally on the power tool 500, or externally on the external device 107 or the server electronic processor 425, to determine whether the feedback is positive or negative (e.g., the feedback may be positive when the sensed output torque is within an acceptable torque range, and negative when outside of the acceptable torque range). Alternatively, the sensed output may be used to scale or transfer outputs and/or adjusted thresholds and/or confidence ranges for the machine learning control 585. As discussed above, in some embodiments, the power tool 500 may send the feedback or other information directly to the server 110, 210, 310, 410 while in other embodiments, an external device 107 may serve as a bridge for communications between the power tool 500 and the server 110, 210, 310 410 and may send the feedback to the server 110, 210, 310, 410.

The server electronic processor 425 then adjusts the machine learning control 585 based on the received user feedback (step 630). In some embodiments, the server electronic processor 425 adjusts the machine learning control 585 after receiving a predetermined number of feedback indications (e.g., after receiving 100 feedback indications). In other embodiments, the server electronic processor 425 adjusts the machine learning control 585 after a predetermined period of time has elapsed (e.g., every two months). In yet other embodiments, the server electronic processor 425 adjusts the machine learning control 585 continuously (e.g., after receiving each feedback indication). Adjusting the machine learning control 585 may include, for example, retraining the machine learning controller 540 using the additional feedback as a new set of training data or adjusting some of the parameters (e.g., weights, support vectors, and the like) of the machine learning controller 540. Because the machine learning controller 540 has already been trained for the particular task, re-training the machine learning controller 540 with the smaller set of newer data requires fewer computing resources (e.g., time, memory, computing power, etc.) than the original training of the machine learning controller 540.

In some embodiments, the machine learning control 585 includes a reinforcement learning control that allows the machine learning control 585 to continually integrate the feedback received by the user to optimize the performance of the machine learning control 585. In some embodiment, the reinforcement learning control periodically evaluates a reward function based on the performance of the machine learning control 585. In such embodiments, training the machine learning control 585 includes increasing the operation time of the power tool 500 such that the reinforcement learning control 585 receives sufficient feedback to optimize the execution of the machine learning control 585. In some embodiments, when reinforcement learning is implemented by the machine learning control 585, a first stage of operation (e.g., training) is performed during manufacturing or before such that when a user operates the power tool 500, the machine learning control 585 can achieve a predetermined minimum performance (e.g., accuracy). The machine learning control 585, once the user operates his/her power tool 500, may continue learning and evaluating the reward function to further improve its performance. Accordingly, a power tool may be initially provided with a stable and predictable algorithm, which may be adapted over time. In some embodiments, reinforcement learning is limited to portions of the machine learning control 585. For example, in some embodiments, instead of potentially updating weights/biases of the entire or a substantial portion of the machine learning control 585, which can take significant processing power and memory, the actual model remains frozen or mostly frozen (e.g., all but last layer(s) or outputs), and only one or a few output parameters or output characteristics (such as final scaling or thresholds) of the machine learning control 585 are updated based on feedback.

In some embodiments, the machine learning controller 540 interprets the operation of the power tool 500 by the user as feedback regarding the performance of the machine learning controller 540. For example, if the user presses the trigger harder during execution of a particular mode, the machine learning controller 540 may determine that the motor speed selected by the machine learning controller 540 is not sufficiently high, and may increase the motor speed directly, use the received feedback to re-train or modify the machine learning controller, or a combination thereof. Accordingly, operation of the power tool 500 may vary between two identical consecutive pulls of the trigger 510 of the power tool 500. In some embodiments, the amount of variance is based on user feedback, a learning rate, or both. Table 4 below, for example, indicates some control of the power tool 500 by the user and how the various types of control are interpreted as feedback regarding the machine learning controller 540 by the machine learning controller 540. This type of feedback may allow the machine learning controller 540 to determine appropriate motor control thresholds and parameters when, for example, the machine learning controller 540 lacks some information regarding the operation of the power tool 500. For example, these feedback mechanisms make it possible for the machine learning controller 540 to alter an operating mode to fasten a self-drilling screw of unknown length.

TABLE 4

| Control Action (by user) | Interpreted Feedback by the Machine Learning Controller |
|---|---|
| Trigger is pulled harder | Machine learning controller interprets as a desired increase in power, speed, torque, ramp, a combination thereof, and the like |
| Power tool is rotated with the fastener (e.g., clockwise) | Machine learning controller interprets as a desired increase in power, speed, torque, ramp, a combination thereof, and the like |
| Trigger is slightly released (pulled less) | Machine learning controller interprets as a desired decrease in power, speed, torque, ramp, a combination thereof, and the like |
| Power tool is rotated against the fastener (e.g., counterclockwise) | Machine learning controller interprets as a desired decrease in power, speed, torque, ramp, a combination thereof, and the like |
| Reach maximum peak torque | Machine learning controller interprets as a necessary adjustment to a mechanical or electronic clutch setting |
| Identify unseated fastener with second pull | Machine learning controller interprets as a necessary adjustment to a mechanical or electronic clutch setting |

TABLE 4-continued

| Control Action (by user) | Interpreted Feedback by the Machine Learning Controller |
|---|---|
| Trigger is released and additional information regarding tool and/or motor motion | Machine learning controller interprets as a necessary adjustment to the kickback detection settings, and the auto-shutoff settings (for saws, for example) |
| Detect Kickback | Machine learning controller interprets as a necessary adjustment to the kickback detection settings |
| Identify stripped fastener by switching to reverse direction | Machine learning controller interprets as a necessary adjustment to a mechanical or electronic clutch setting. |

In some embodiments, the server 110, 210, 310, 410 receives tool usage data from a variety of different power tools in, for example, step 625. Accordingly, when the server electronic processor 425 adjusts the machine learning control 585 based on the user feedback (step 630), the server electronic processor 425 may be adjusting the machine learning control 585 based on feedback from various users. In embodiments in which the machine learning controller 540 is fully implemented on the power tool 500 (e.g., such as discussed above with respect to FIG. 4A-B), the electronic processor 550 may use the feedback indications from only the power tool 405 to adjust the machine learning controller 420 of the same power tool 405. In other words, some power tools 500 may use only the feedback information from particular users to adjust the machine learning control 585. Using the feedback information from particular users may help customize the operation of the power tool 500 for the user of that particular tool.

After the server electronic processor 425 adjusts the machine learning controller 540 based on the user feedback, the power tool 500 operates according to the outputs and determinations from the adjusted machine learning controller 540 (step 635). In some embodiments, such as the power tool system 300 of FIG. 3, the server 310 transmits the adjusted machine learning control 585 to the power tool 500. The power tool 500 then stores the adjusted machine learning control 585 in the memory 560 of the machine learning controller 540 (or in the memory 560 of the power tool 500) and operates the motor 505 according to the adjusted machine learning controller 540. The adjusted machine learning controller 540 improves its performance by using a larger and more varied dataset (e.g., by receiving feedback indications from various users) for the training of the machine learning controller 540.

In some embodiments, the user may also select a learning rate for the machine learning controller 540. Adjusting the learning rate for the machine learning controller 540 impacts the speed of adjustment of the machine learning controller 540 based on the received user feedback. For example, when the learning rate is high, even a small number of feedback indications from the user (or users) will impact the performance of the machine learning controller 540. On the other hand, when the learning rate is lower, more feedback indications from the user are used to create the same change in performance of the machine learning controller 540. Using a learning rate that is too high may cause the machine learning controller 540 to change unnecessarily due to an anomaly operation of the power tool 500. On the other hand, using a learning rate that is too low may cause the machine learning controller 540 to remain unchanged until a large number of feedback indications are received requesting a similar change. In some embodiments, the power tool 500 includes a dedicated actuator to adjust the learning rate of the machine learning controller 540. In another embodiment, the activation switch 545 used to enable or disable the machine learning controller 540 may also be used to adjust the learning rate of the machine learning controller 540. For example, the activation switch 545 may include a rotary dial. When the rotary dial is positioned at a first end, the machine learning controller 540 may be disabled, as the rotary dial moves toward a second end opposite the first end, the machine learning controller 540 is enabled and the learning rate increases. When the rotary dial reaches the second end, the learning rate may be at a maximum learning rate. In other embodiments, an external device 107 (e.g., smartphone, tablet, laptop computer, an ASIC, and the like), may communicatively couple with the power tool 500 and provide a user interface to, for example, select the learning rate. In some embodiments, the selection of a learning rate may include a selection of a low, medium, or high learning rate. In other embodiments, more or less options are available to set the learning rate and may include the ability to turn off learning (i.e., setting the learning rate to zero).

As discussed above, when the machine learning controller 540 implements a recurrent neural network, the learning rate (or sometimes referred to as a "switching rate") affect how previous inputs or training examples affect the output of the current input or training example. For example, when the switching rate is high the previous inputs have minimal effect on the output associated with the current input. That is, when the switching rate is high, each input is treated more as an independent input. On the other hand, when the switching rate is low, previous inputs have a high correlation with the output of the current input. That is, the output of the current input is highly dependent on the outputs determined for previous inputs. In some embodiments, the user may select the switching rate in correlation (e.g., with the same actuator) with the learning rate. In other embodiments, however, a separate actuator (or graphical user interface element) is generated to alter the switching rate independently from the learning rate. The methods or components to set the switching rate are similar to those described above with respect to setting the learning rate.

The description of FIG. 6 focuses on the server electronic processor 425 training, storing, and adjusting the machine learning control 585. In some embodiments, however, the electronic processor 550 of the power tool 500 may perform some or all of the steps described above with respect to FIG. 6. For example, FIG. 4 illustrates an example power tool system 400 in which the power tool 405 stores and adjusts the machine learning controller 540. Accordingly, in this system 400, the electronic processor 550 performs some or all of the steps described above with respect to FIG. 6. Analogously, in some embodiments, the electronic processor 575 of the machine learning controller 540 or the external device 107 performs some or all of the steps described above with respect to FIG. 6.

Figure 7:
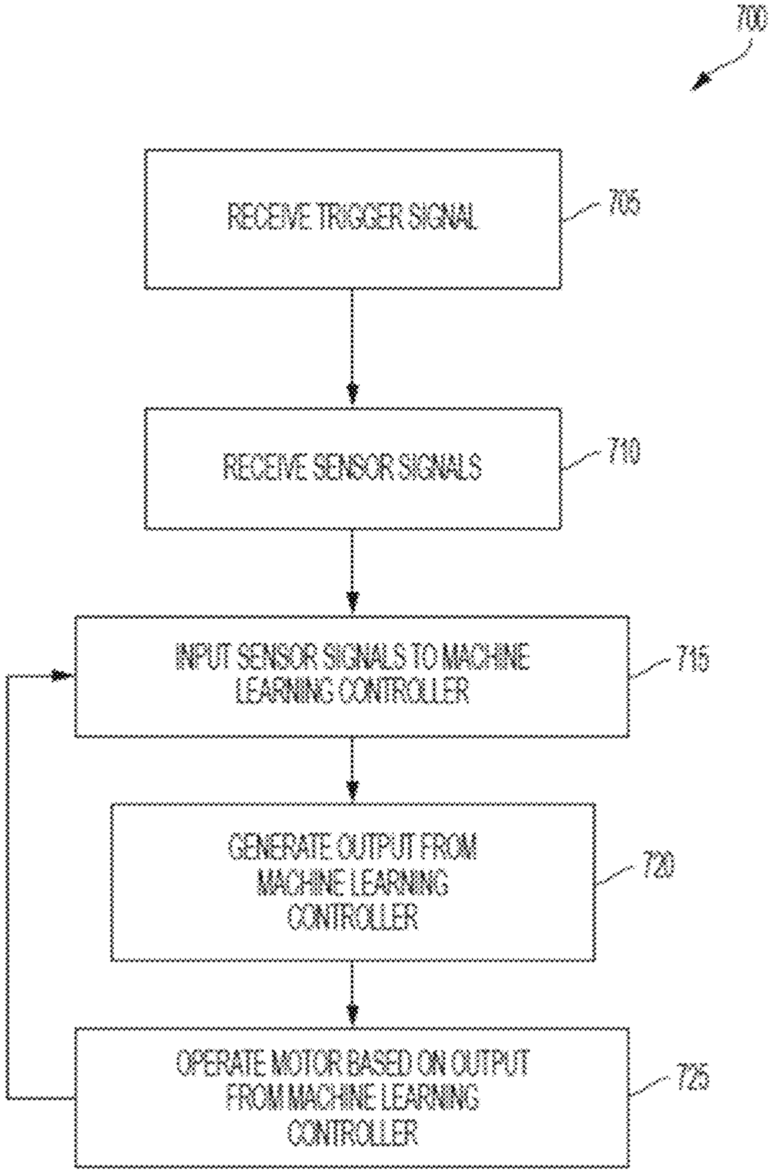
FIG. 7 is a flowchart illustrating a method of operating the power tool of FIG. 5A according to the machine learning controller.

FIG. 7 is a flowchart illustrating a method 700 of operating the power tool 500 according to the machine learning controller 540 as referenced in step 620 of FIG. 6. In step 705, the power tool 500 receives a trigger signal from the trigger 510 indicating that the power tool 500 is to begin an operation. During operation of the power tool 500, the electronic processor 550 receives output sensor data (step 710) from the sensors 530. As discussed above, the output sensor data provide varying information regarding the operation of the power tool 500 (referred to as operational parameters) including, for example, motor position, motor speed, spindle position, spindle speed, output torque, position of the power tool 500, battery pack state of charge, date, time, time, time since last use, mode, clutch setting, direction, battery type, presence of side-handle, errors, history of past applications and switching rate, user input, external inputs, gear and the like, see again Table 3. The electronic processor 550 then provides at least some of the sensor data to the machine learning controller 540 (step 715). In embodiments in which the electronic processor 550 implements the machine learning control 585, the electronic processor 550 bypasses step 715. When the power tool 500 does not store a local copy of the machine learning controller 540, such as in the power tool system 100 of FIG. 1, the electronic processor 550 transmits some or all of the sensor information to the server 110 where the machine learning controller 540 analyzes the received information in real-time, approximately real-time, at a later time, or not at all.

The sensor information transmitted to the machine learning controller 540 varies based on, for example, the particular task for the machine learning controller 540. As discussed above, the task for the machine learning controller may vary based on, for example, the type of power tool 500. For example, in the context of an impact driver, the machine learning controller 540 for the power tool 500 may be configured to identify a type of application of the power tool 500 and may use specific operational thresholds for each type of application. In such embodiments, the electronic processor 550 may transmit, for example, the rotating speed of the motor 505, the rotating speed of the spindle, the operating mode of the power tool, but may not send the battery pack state of charge. The machine learning controller 540 then generates an output based on the received sensor information and the particular task associated with the machine learning controller 540 (step 720). For example, the machine learning program executing on the machine learning controller 540 processes (e.g., classifies according to one of the aforementioned machine learning algorithms) the received sensor information and generates an output. In the example above, the output of the machine learning controller 540 may indicate a type of application for which the power tool 500 is being used. The electronic processor 550 then operates the motor 505 based on the output from the machine learning controller 540 (step 725). For example, the electronic processor 550 may use the output from the machine learning controller 540 to determine whether any operational thresholds (e.g., starting speed, maximum speed, finishing speed, rotating direction, number of impacts, and the like) are to be changed to increase the efficacy of the operation of the power tool 500.

The electronic processor 550 then utilizes the updated operational thresholds or ranges to operate the motor 505. In another example, the output may indicate a condition of the tool and the electronic processor 550 controls the motor dependent on the condition. For example, and as described in further detail below, the condition may indicate an output torque value of the motor, an obstacle that is detected, an abnormal accessory condition that is detected, a kickback that is detected, or an operation that is finished (e.g., a fastening operation is completed). In another example, a detected impact is used to predict the ideal blow-to-blow motor profile to optimize impact timing, additional torque delivery, maximum torque delivery, or another characteristic of the impact. The motor, in turn, may be controlled to stop, to increase speed, or decrease speed (e.g., via braking) based on the condition, or may be controlled in other ways based on the condition. Although the particular task of the machine learning controller 540 may change as described in more detail below, the electronic processor 550 uses the output of the machine learning controller 540 to, for example, better operate the power tool 500 and achieve a greater operating efficiency.

In some embodiments, the machine learning controller 540 receives user characteristics of the current user of the power tool 500 in step 715, in addition to or instead of sensor data, and then generates an output in step 720 based on the user characteristics or based on the user characteristics and the sensor data received in step 715. In some embodiments, in addition to or instead of controlling the motor in step 725, another electronically controllable element is controlled. For example, in some embodiments, one or more of an LED of the power tool is enabled, disabled, has its color changed, or has its brightness changed; a gear ratio of the power tool is changed (e.g., the gear ratio is increased or decreased, or a gear ratio from a plurality of gear ratios is selected), a solenoid of the power tool is enabled or disabled, or an electronic filtering rate is adjusted for a faulting or noisy sensor. In some embodiments, an electrically controlled clutch is engaged/disengaged or adjusted to avoid overshoot on bolts and stripping on fasteners. In other embodiments, motor driving characteristics are changed such as which winding are used and/or the use of field weakening/phase advance techniques.

In some embodiments, the server 110, 210, 310, 410 may store a selection of various machine learning controls 585 in which each machine learning control 585 is specifically trained to perform a different task. In such embodiments, the user may select which of the machine learning controls 585 to implement with the power tool 500. For example, an external device 107 may provide a graphical interface that allows the user to select a type of machine learning control 585. A user may select the machine learning control 585 based on, for example, applications for which the user utilizes the power tool 500 often (e.g., if the user often installs drywall), or commonly used power tools (e.g., a user often uses an impact driver). In such embodiments, the graphical user interface receives a selection of a type of machine learning control 585. The external device 107 may then send the user's selection to the server 110, 210, 310, 410. The server 110, 210, 310, 410 would then transmit a corresponding machine learning control 585 to the power tool 500 or may transmit updated operational thresholds based on the outputs from the machine learning control 585 selected by the user. Accordingly, the user can select which functions to be implemented with the machine learning control 585 and can change which type of machine learning control 585 is implemented by the server 110, 210, 310, 410 or the power tool 500 during the operation of the power tool 500.

Figure 8:
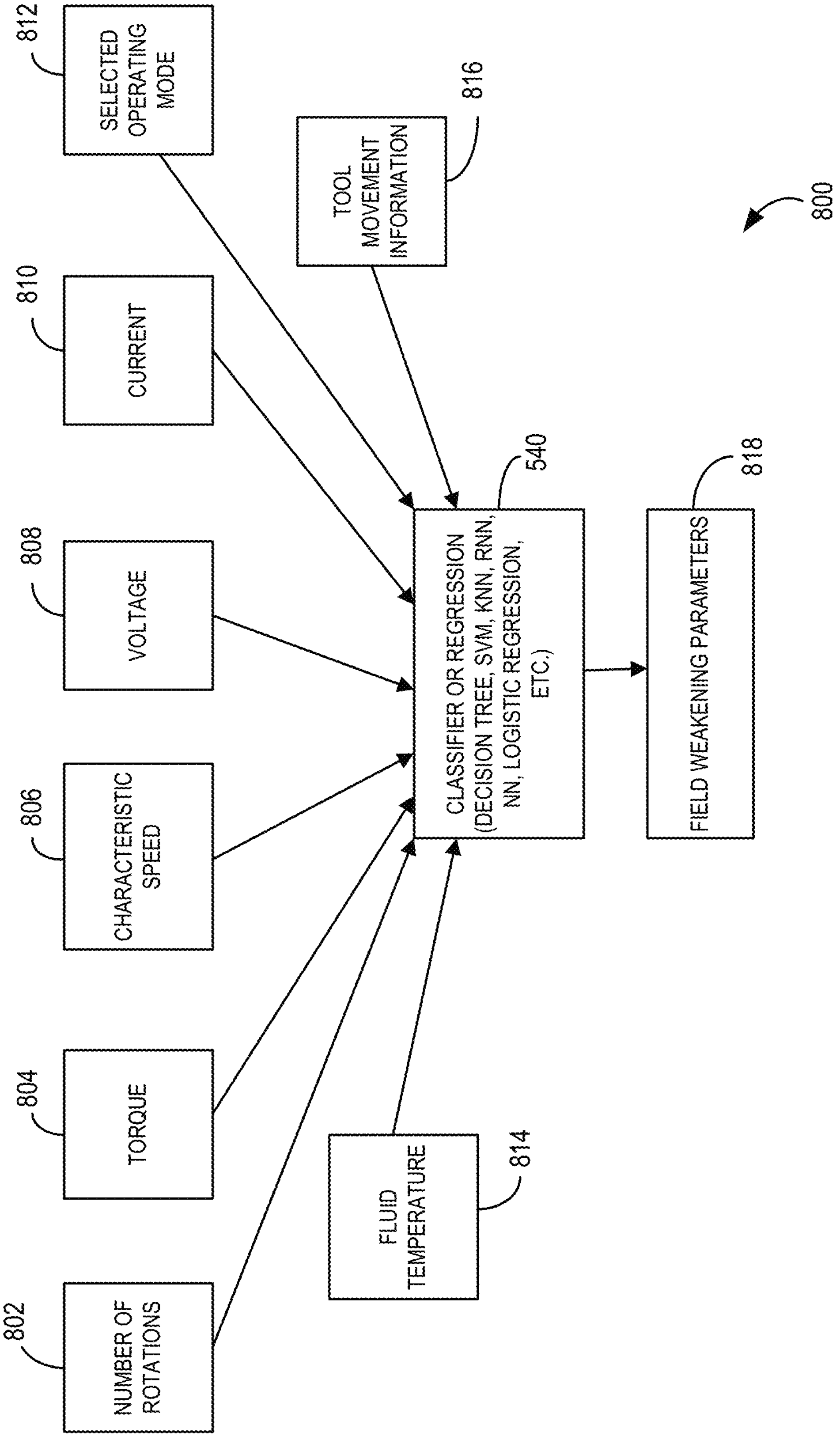
FIG. 8 is a machine learning control program, according to some embodiments described herein.

As discussed above, the machine learning controller 540 is associated with one or more particular tasks. The machine learning controller 540 receives various types of information from the power tool 500 and the electronic processor 550 based on the particular task for which the machine learning controller 540 is configured. For example, FIG. 8 illustrates a diagram 800 for an example use of the machine learning controller 540 for use with a power tool, such as power tool 500. In the illustrated embodiment, the machine learning controller 540 is configured to determine one or more field weakening parameters for a given application. In such an embodiment, the machine learning controller 540 receives multiple operational parameters (inputs) associated with the tool 500. These operational parameters may include a number of rotations 802, a measured torque 804, a characteristic speed 806, one or more voltages 808, one or more currents 810, a selected operating mode 812 of the tool 500, a fluid temperature 814 (e.g., for use on hydraulic impulse tools), and tool movement information 816 (e.g., provided via a gyroscope, a motion sensor, and the like.).

In some embodiments, the information (operational parameters) described above is generated by the electronic processor 550 based on sensor data from the sensors 530, arithmetic operations using the sensor data (e.g., to calculate torque), and comparisons of the sensor data or calculated values with a threshold (e.g., defining whether an increase or decrease of an operational parameter is rapid). The generated information is then received by the machine learning controller 540 during the operation of the tool. Based on the received information, the machine learning controller 540 determines and outputs one or more field weakening parameters 818 to the electronic processor 550, and the electronic processor 550 controls an output of the tool 500 accordingly. For example, the machine learning controller 540 may indicate to the electronic processor 550 to increase or decrease an advance angle and/or freewheel angle of the conduction of the motor 505. In one embodiment, the machine learning controller 540 may utilize, for example, a neural network with multiple outputs such that each output corresponds to an advance angle for the motor 505. In some examples, the neural networks may be relatively small, thereby allowing the electronic processor 550 to perform the functions of the machine learning controller 540 without first significantly increasing processing capacity or capabilities, or otherwise upgrading the hardware of the processor 550.

As discussed above, the machine learning controller 540 may enact one or more field weakening processes or operations. Field weakening is generally used with a permanent magnet motor, such as motor 505. As the permanent magnet motor rotates, a back emf is generated in one or more windings of the motor 505, which in turn makes driving current into the motor 505 more difficult, thereby resulting in a loss of speed or torque at the output of the motor 505. In one example, field weakening is achieved by advancing the conduction angle by a specific value, known as an advance angle. The advance angle may be applied based on a current speed of the motor 505. In some examples, the advance angle is only modified once a speed threshold has been exceeded. In one embodiment, an increase in advance angle causes a corresponding increase in an overall conduction angle applied to the motor 505. However, in some examples, the conduction angle may be shifted by an amount equal to the advance angle such that the overall conduction angle remains the same. Additionally, a freewheel angle may be modified in addition to, or in conjunction with, a change in conduction angle or advance angle. Freewheeling occurs when a motor winding is disconnected from an excitation voltage provided by one or more switches within the switching network 517 and a current stored within one or more armatures of the motor flows through one or more switches within the switching network 517 (or through one or more freewheeling diodes within the switching network 517) to a supply rail opposite the supply rail that previously provided power to the armature during the previous conduction cycle.

Previous implementations of field weakening generally relied on one or more Hall-effect or other positions sensors associated with the rotor of a motor to determine when to conduct each of the transistors in a switching network, such as switching network 517. The following embodiments utilize one or more operating parameters of the power tool 500 to modify one or more field weakening parameters to perform various field weakening operations.

Figure 9:
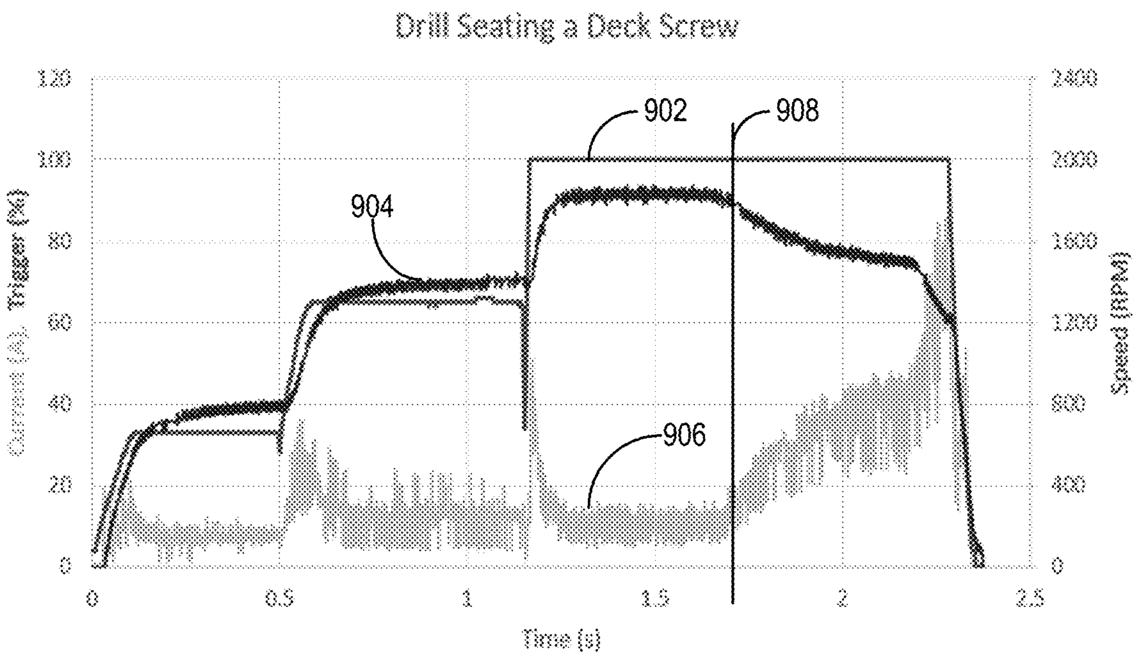
FIG. 9 is a graph of motor current, trigger position, motor speed with respect to time.

Turning now to FIG. 9, a data plot 900 showing an example output of a motor associated with a power tool, such as motor 505, during a deck screw operation is shown. A trigger input 902 associated with a user input, such as via trigger 510, is shown with three distinct input levels over time. A speed 904 of the motor 505 generally follows the trigger input 902. A current 906 tracks along with the trigger input 902 and speed 904. As shown in FIG. 9, the current is generally noisy and exhibits inrush peaks when the trigger 510 is actuated from one position to another. At around the 1.75 second mark at point 908, the current 906 starts to increase and the speed 904 conversely begins to decrease. In instances where the motor 505 is a permanent magnet motor, this decrease in speed 904 and increase in current 906 may be due to an increase in back emf generated by the motor 505. Accordingly, it may be advantageous to apply field weakening to maintain speed at point 908 in order to maintain motor speed throughout the fastening operation.

Figure 10:
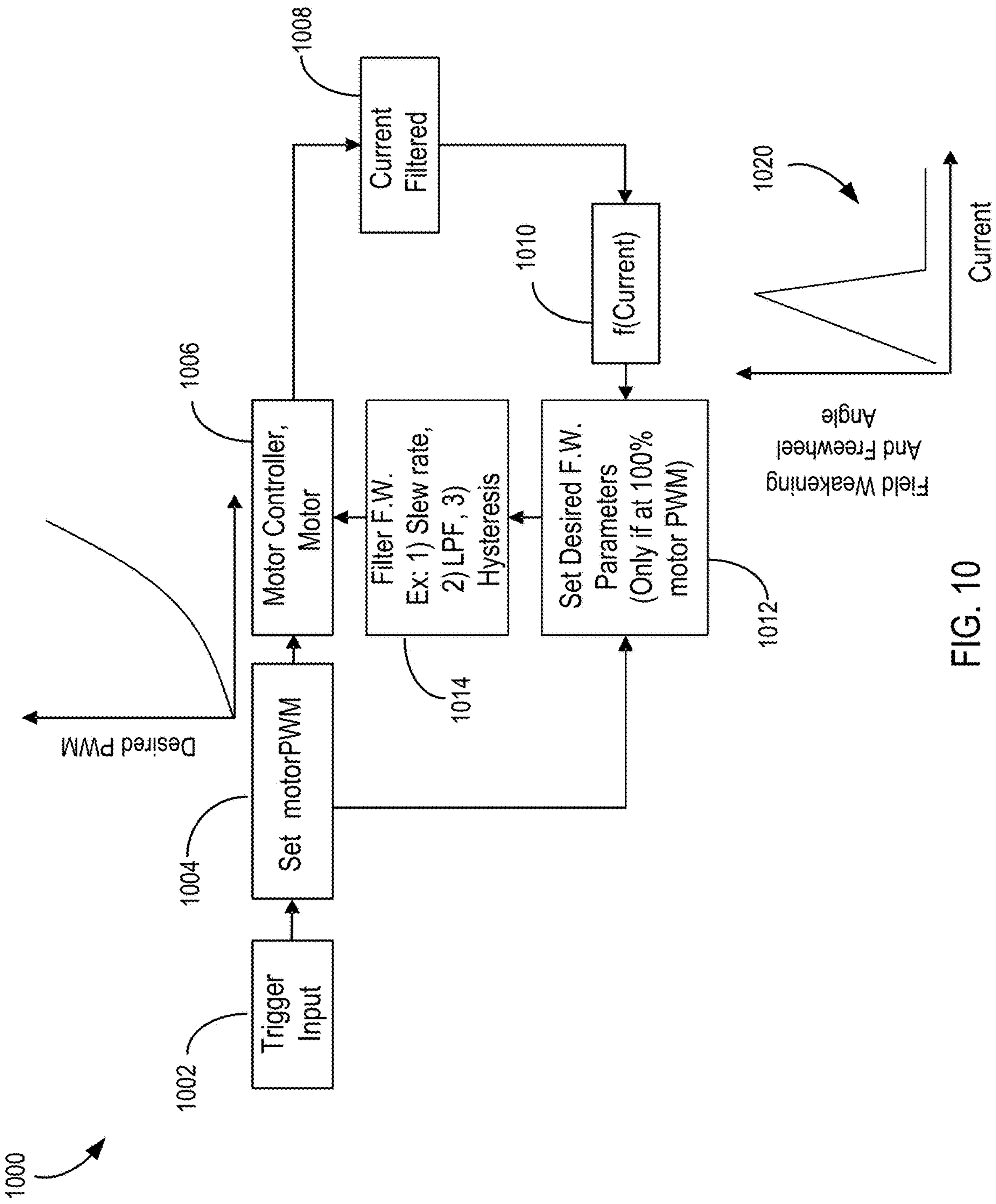
FIG. 10 is a field weakening control program, according to some embodiments described herein.

FIG. 10 illustrates a control process 1000 for performing field weakening based on the current provided to the motor 505. A trigger input is provided at 1002 to the electronic processor 550, which then sets a motor PWM output at 1004 to control a speed of the motor based on the trigger input. The motor PWM is provided to a motor controller at 1006. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above. While the control process of FIG. 10 is described as being performed by one or more components of the power tool 500, it is understood that the control process 1000 may be executed by one or more components, such as the electronic processor 550, the processing unit 557, the control unit 572, or other components, either alone or in combination. Any reference to a specific component of the power tool 500 is for illustrative purposes and should not be considered as limiting any functions to any one or more components.

A current applied to the motor is sensed and filtered at 1008. In one embodiment, the current is filtered to remove or reduce noise associated with the current signal such that an accurate representation of the current may be provided to the electronic processor and/or the processing unit 557. In one embodiment, the processing unit 557 applies one or more software filters to the current signal. The software filters may include one or more of low pass filters, Butterworth filters, rolling average filters, or other filters as appropriate for a given application. A filtered current is then output at 1010 to the processing unit 557 which sets one or more field weakening parameters at 1012 based on the filtered current. In the control process 1000, the field weakening parameters are only set if the motor is operating at 100% PWM (e.g., the trigger is fully engaged). Example field weakening parameters may include advance angle, freewheel angle, conduction angle, etc. In some embodiments, as the value of the filtered current increases, the field weakening parameters are modified to maintain a speed or other operating characteristic (e.g., current) of the motor 505. For example, an advance angle may be increased in response to an increase in the filtered current to aid in maintaining speed of the motor 505. In other embodiments, a conduction angle may be increased in response to an increase in the filtered current to aid in maintaining the speed of the motor 505.

For example, as shown in plot 1020, as current increases, one or more field weakening parameters, such as advance angle and/or conduction angle increases as the current increases until a threshold is reached, at which point the field weakening parameter(s) are reduced. In some embodiments, the field weakening parameter(s) are decreased due to saturation of the motor 505. While the field weakening parameters(s) are shown as generally having a linear increase, other variation types, such as trapezoidal, sigmoid-like, piecewise, stepped, etc. may be used. Plot 1020 is exemplary only, and it is understood that other power tools or operations having similar profiles may be used to generate additional speed vs. torque profiles or achieve other user desired goals. By generating various speed vs. torque profiles, the "stiffness" or maintenance of speed may be affected.

One or more filters may then be applied to the field weakening parameters at 1014. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The filtered field weakening parameters are then provided to the motor controller at 1006 to control the motor 505.

Figure 11:
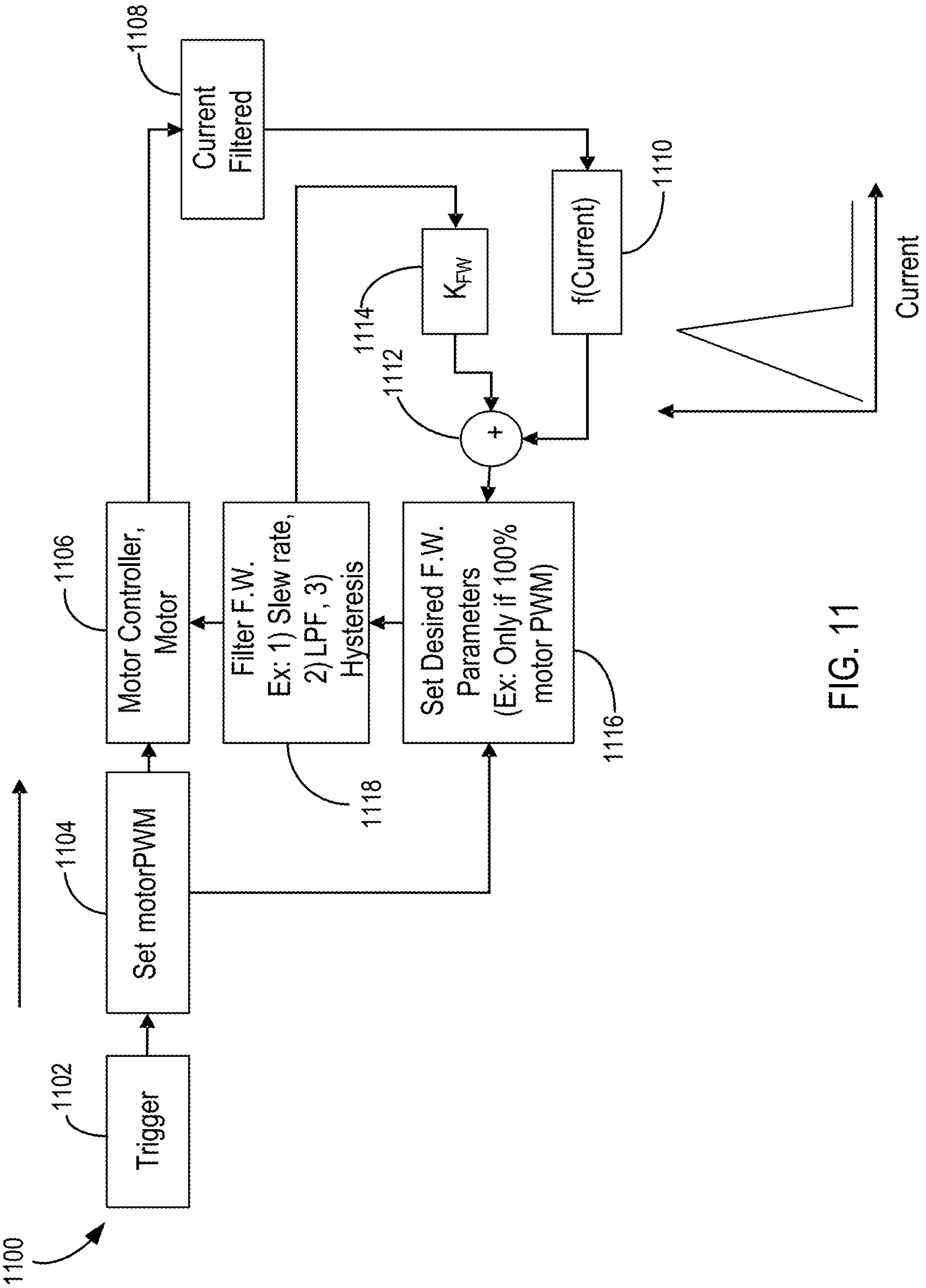
FIG. 11 is a field weakening control program, according to some embodiments described herein.

Turning now to FIG. 11, a modified control process 1100 for performing field weakening based on the current provided to the motor 505 is provided, according to some embodiments. A trigger input is provided at 1102 to the electronic processor 550 which then sets a motor PWM output at 1104 to control a speed of the motor based on the trigger input. The motor PWM is provided to a motor controller at 1106. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above. While the control process 1100 is described as being performed by one or more components of the power tool 500, it is understood that the control process 1100 may be executed by one or more components, such as the electronic processor 550, the processing unit 557, the control unit 572, or other components, either alone or in combination. Any reference to a specific component of the power tool 500 is for illustrative purposes and should not understood as limiting any functions to any one or more components.

A current applied to the motor is sensed and filtered at 1108. In one embodiment, the current is filtered to remove or reduce noise associated with the current signal such that an accurate representation of the current may be provided to the electronic processor and/or the processing unit 557. In one embodiment, the processing unit 557 applies one or more software filters to the current signal. A filtered current is then output at 1110 to a summer 1112 where it is combined with a field weakening compensation factor $K_{FW}$ generated at 1114. In some embodiments, the field weakening compensation factor may include one or more of an advance angle, a conduction angle, and/or a freewheel angle compensation factor. The field weakening compensation factor compensates for potential lost efficiency when simply adding field weakening naturally, such as described above in control process 1000. In some embodiments, the field weakening compensation factor is described as a constant. In other embodiments, the field weakening compensation factor may be a linear and/or non-linear function which provides the field weakening compensation factor based on one or more various parameters, such as motor current, speed, etc. In some embodiments, the field weakening compensation factor is adjusted based on feedback from one or more field weakening filters, as described below.

The combined filtered current and field weakening factor are output to the processing unit 557, which sets one or more field weakening parameters at 1116 based on the filtered current and the field weakening compensation factor. In the control process 1100, the field weakening parameters are only set if the motor is operating at 100% PWM (e.g., the trigger is fully engaged). Example field weakening parameters may include advance angle, freewheel angle, conduction angle, etc. In some embodiments, as the value of the filtered current increases, the field weakening parameters are modified to maintain a speed or other operating parameter of the motor 505. For example, an advance angle may be increased in response to an increase in the filtered current to aid in maintaining speed of the motor 505.

One or more filters may then be applied to the field weakening parameters at 1118. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The filtered field weakening parameters are then provided to the motor controller at 1006 to control the motor 505. Additionally, the filtered field weakening parameters may also be used as an input to generate and/or modify the field weakening compensation factor at 1114.

Figure 12:
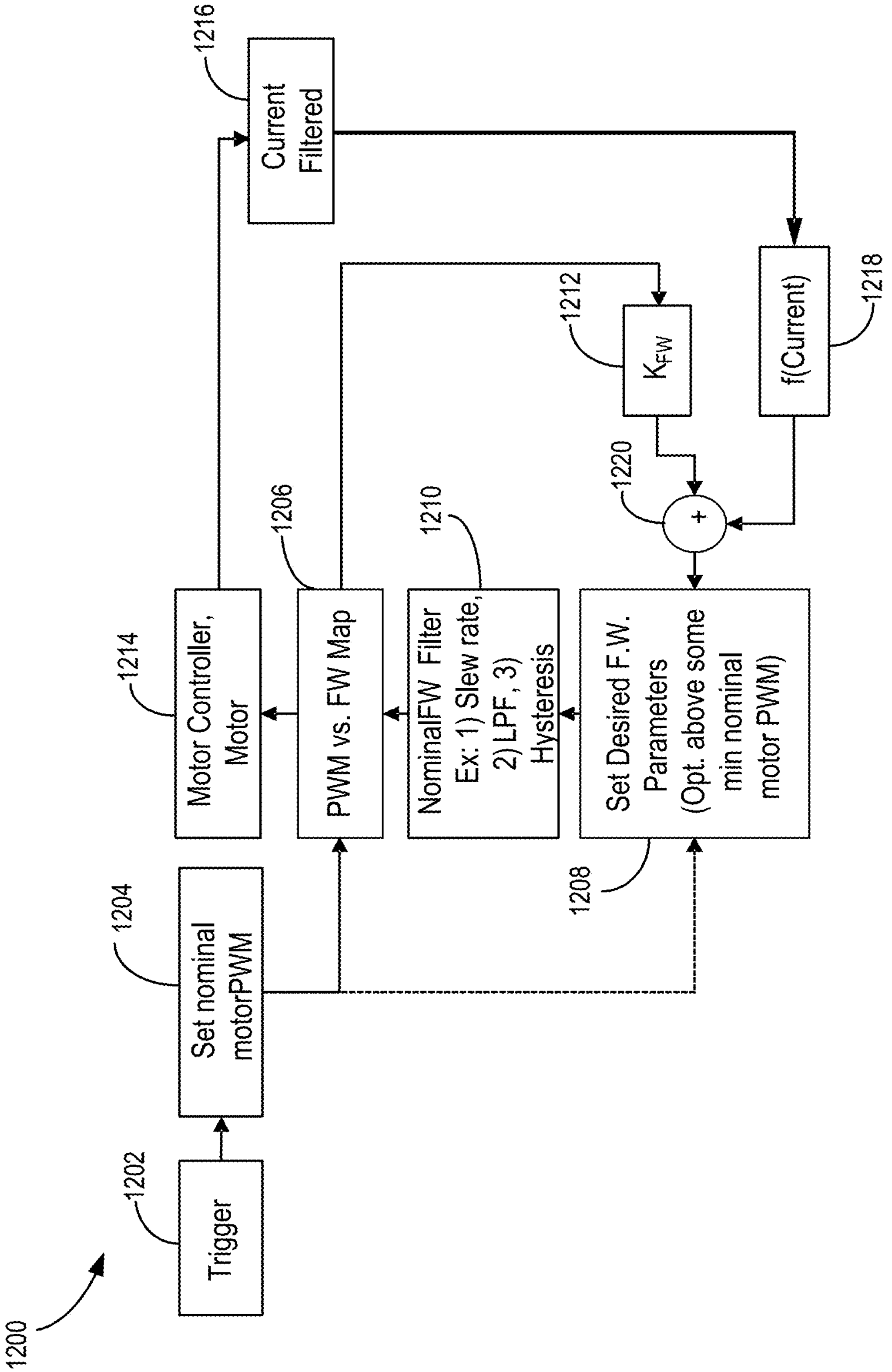
FIG. 12 is a field weakening control program, according to some embodiments described herein.

Turning now to FIG. 12, a controller process 1200 for performing field weakening based on the current provided to the motor 505 and a variable PWM value is shown, according to some embodiments. A trigger input is provided at 1202 to the electronic processor 550, which then sets a motor PWM output at 1204 to control a speed of the motor 505 based on the trigger input, such as via trigger 510.

The PWM value is input into a PWM vs. Field Weakening ("FW") map at 1206. The PWM vs. FW map may include one or more field weakening parameters that are correlated to a given PWM value. In some embodiments, the PWM vs. FW map is a lookup table. In other embodiments, the PWM vs. FW map includes one or more functions to determine one or more field weakening parameters based on the received PWM value. In one example, the mapping function may be: MotorPWM=min(nominalPWM+nominal FW, 100); FW=max(nominalFW+nominalPWM−100, 0), wherein the nominalPWM value is equal to a PWM value associated with the trigger signal; and the nominalFW value is based on one or more filtered field weakening parameters, as described below. In some embodiments, the PWM vs. FW map may be used to allow for more efficient operation of a power tool by first attempting to vary the PWM to maintain speed in lieu of using field weakening. Generally, field weakening may generate heat within the motor and/or switching network and increasing PWM may be used to maintain speed without introducing additional heat into the system. For example, where a user input, such as via trigger 510, is at 50%, more PWM may be added to maintain the speed based on the PWM vs FW map. However, where the user input is at a higher value, such as 90% or greater of maximum, the amount of PWM that is available is limited, and therefore field weakening, such as advance angle or conduction angle variation, may be applied to assist in maintaining the desired speed.

In some examples, reverse field weakening or centerline commutation may be applied, wherein the power tool's 105 desired output is slightly below a nominal value (e.g., 100%) but the PWM is run at 100% with the advance angle, the freewheel angle, and commutation angle adjusted so that the motor is effectively unpowered at particular angles of commutation. This has the benefit of minimizing high frequency switching losses associated with operating a motor at maximum PWM while still decreasing the output of the tool.

The PWM value is also input to the processing unit 557 which sets one or more field weakening parameters at 1208 based on the filtered current and the field weakening compensation factor. In some embodiments of the control process 1200, the field weakening parameters are only set if the motor is operating at 100% PWM (e.g., the trigger is fully engaged). Example field weakening parameters may include advance angle, freewheel angle, conduction angle, etc. In some embodiments, as the value of the filtered current increases, the field weakening parameters are modified to maintain a speed of the motor 505. For example, an advance angle may be increased in response to an increase in the filtered current to aid in maintaining speed of the motor 505.

One or more filters may then be applied to the field weakening parameters at 1210. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The filtered field weakening parameters are then provided to the PWM vs. FW map at 1206, to allow for the PWM vs. FW map to be updated based on the filtered field weakening parameters. Additionally, the filtered field weakening parameters may also be used as an input to generate and/or modify the field weakening compensation factor at 1212.

A PWM value and one or more field weakening parameters are output to a motor controller at 1214 based on the output from the PWM vs. FW map. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above. While the control process 1200 is described as being performed by one or more components of the power tool 500, it is understood that the control process 1200 may be executed by one or more components, such as the electronic processor 550, the processing unit 557, the control unit 572, or other components, either alone or in combination. Any reference to a specific component of the power tool 500 is for illustrative purposes and should not understood as limiting any functions to any one or more components.

A current applied to the motor is sensed and filtered at 1216. In one embodiment, the current is filtered to remove or reduce noise associated with the current signal such that an accurate representation of the current may be provided to the electronic processor and/or the processing unit 557. In one embodiment, the processing unit 557 applies one or more software filters to the current signal. A filtered current is then output at 1218 to a summer 1220 where it is combined with the field weakening compensation factor $K_{FW}$ generated at 1212. In some embodiments, the field weakening compensation factor may include one or more of an advance angle, a conduction angle, and/or a freewheel angle compensation factor. The field weakening compensation factor compensates for potential lost efficiency when simply adding field weakening naturally, such as described above in control process 1000. In some embodiments, the field weakening compensation factor is described as a constant. In other embodiments, the field weakening compensation factor may be a linear and/or non-linear function which provides the field weakening compensation factor based on one or more various parameters, such as motor current, speed, etc. In some embodiments, the field weakening compensation factor is adjusted based on feedback from one or more field weakening filters, as described below.

The combined filtered current and field weakening factor are output to the processing unit 557, which may be configured to modify one or more field weakening parameters at 1208 based on the filtered current and the field weakening compensation factor. Example field weakening parameters may include advance angle, freewheel angle, conduction angle, etc. In some embodiments, as the value of the filtered current increases, the field weakening parameters are modified to maintain a speed of the motor 505. For example, an advance angle may be increased in response to an increase in the filtered current to aid in maintaining speed of the motor 505. The updated field weakening parameters may then be filtered at 1218 as described above.

Figure 13:
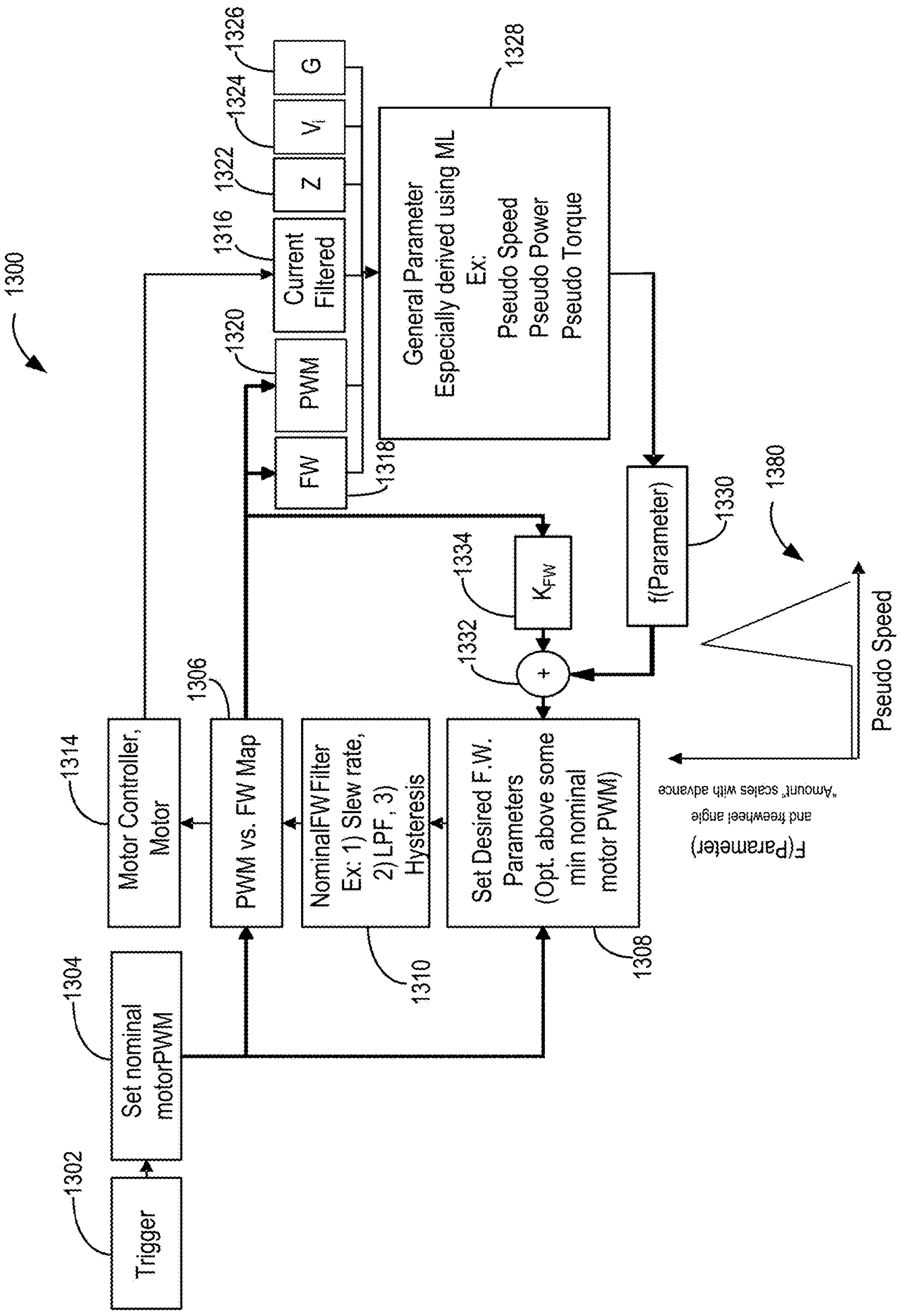
FIG. 13 is a field weakening control program, according to some embodiments described herein.

Turning now to FIG. 13, a control process 1300 for performing field weakening based on current provided to the motor 505 and a variable PWM value using machine learning is shown, according to some embodiments. A trigger input is provided at 1302 to the electronic processor 550, which then sets a motor PWM output at 1304 to control a speed of the motor 505 based on the trigger input, such as via trigger 510.

The PWM value is input into a PWM vs. Field Weakening ("FW") map at 1306. The PWM vs. FW map may include one or more field weakening parameters that are correlated to a given PWM value. In some embodiments, the PWM vs. FW map is a lookup table. In other embodiments, the PWM vs. FW map includes one or more functions to determine one or more field weakening parameters based on the received PWM value. In one example, the mapping function may be: MotorPWM=min(nominalPWM+nominal FW, 100); FW=max(nominalFW+nominalPWM−100, 0), wherein the nominalPWM value is equal to a PWM value associated with the trigger signal; and the nominalFW value is based on one or more filtered field weakening parameters, as described below.

The PWM value is also input to the processing unit 557, which sets one or more field weakening parameters at 1308 based on the filtered current and the field weakening compensation factor. In some embodiments of the control process 1300, the field weakening parameters are only set if the motor is operating at 100% PWM (e.g., the trigger is fully engaged). Example field weakening parameters may include advance angle, freewheel angle, conduction angle, etc. In some embodiments, as the value of one or more general parameters, as described below, change the field weakening parameters are modified to maintain a speed of the motor 505. For example, an advance angle may be increased in response to a change in one or more general parameters as described below. In other examples, as shown in chart 1380, one or more field weakening parameters are varied once speed (or pseudo speed as described below) reaches a threshold (such as 50% of maximum) that requires field weakening to be applied to maintain the desired speed. Accordingly, a field weakening parameter 1382 is applied to maintain the desired speed.

One or more filters may then be applied to the field weakening parameters at 1310. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The filtered field weakening parameters are then provided to the back to the PWM vs. FW map at 1306, to allow for the PWM vs. FW map to be updated based on the filtered field weakening parameters. Additionally, the filtered field weakening parameters may also be used as an input to generate and/or modify the field weakening compensation factor at 1334.

A PWM value and one or more field weakening parameters are output to a motor controller at 1314 based on the output from the PWM vs. FW map. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above. While the control process 1300 is described as being performed by one or more components of the power tool 500, it is understood that the control process 1300 may be executed by one or more components, such as the electronic processor 550, the processing unit 557, the control unit 572, or other components, either alone or in combination. Any reference to a specific component of the power tool 500 is for illustrative purposes and should not understood as limiting any functions to any one or more components.

One or more sensors, such as sensors 530 described above, are then configured to monitor one or more parameters associated with the operation of the power tool 500. In one embodiment, a motor current 1316 is sensed and filtered. One or more field weakening parameters 1318 are provided by the PWM vs. FW map at 1306, and an associated PWM value 1320 is provided by the PWM vs. FW map at 1306. Additionally, a battery impedance ("Z") 1322 is sensed. In one embodiment, the battery impedance 1322 is sensed using the one or more sensors 530. In other embodiments, the battery impedance 1322 is sensed by one or more sensors within the battery pack 480, and transmitted to the power tool 500, such as via the power interface 515. An initial battery voltage ("Vi") 1324 is further sensed. In one embodiment, the battery voltage 1324 is sensed using the one or more sensors 530. In other embodiments, the battery voltage 1324 is sensed by one or more sensors within the battery pack 480, and transmitted to the power tool 500, such as via the power interface 515. One or more tool motion inputs ("G") 1326 may also be sensed. For example, the sensors 530 may include one or more gyroscopes and/or accelerometers, which may provide the one or more motion inputs 1326.

The sensed values are then evaluated by one or more components of the electronic control assembly 536 at 1328 to derive one or more general parameters, such as pseudo speed, pseudo power, pseudo torque, etc., which may then be used to modify one or more field weakening parameters, as described herein. Using pseudo parameter values in lieu of measured parameters may be advantageous as the application of field weakening to a system can change the linear relationship of measured values to calculated values, such as current to torque, etc. In some embodiments, the electronic processor 550 uses one or more processes or algorithms to generate the one or more general parameters. In other embodiments, the machine learning controller 540 generates the general parameters using one or more machine learning algorithms, such as those described above. For example, the machine learning controller 540 may use one or more of a DNN, RNN, CNN, or regression to derive the general parameters. In other examples, the machine learning controller 540 may derive the general parameters using one or more analytic functions, such as a polynomial regression.

The general parameters are then output at 1330 to a summer 1332 where the general parameters are combined with a field weakening compensation factor $K_{FW}$ generated at 1334. In some embodiments, the field weakening compensation factor may include one or more of an advance angle, a conduction angle, and/or a freewheel angle compensation factor. The field weakening compensation factor compensates for potential lost efficiency when simply adding field weakening naturally, such as described above in control process 1000. In some embodiments, the field weakening compensation factor is described as a constant. In other embodiments, the field weakening compensation factor may be a linear and/or non-linear function which provides the field weakening compensation factor based on one or more various parameters, such as motor current, speed, etc. In some embodiments, the field weakening compensation factor is adjusted based on feedback from one or more field weakening filters, as described below. In further examples, the field weakening compensation factor may be based, at least in part, on an output from the PWM vs. FW map generated at 1306.

The combined general parameters and field weakening compensation factor are output to the processing unit 557, which may be configured to modify one or more field weakening parameters at 1308 based on the general parameters and the field weakening compensation factor. For example, as shown in FIG. 13, chart 1380 shows how that as the pseudo speed increases, one or more field weakening parameters 1308 may be increased to maintain speed.

Figure 14:
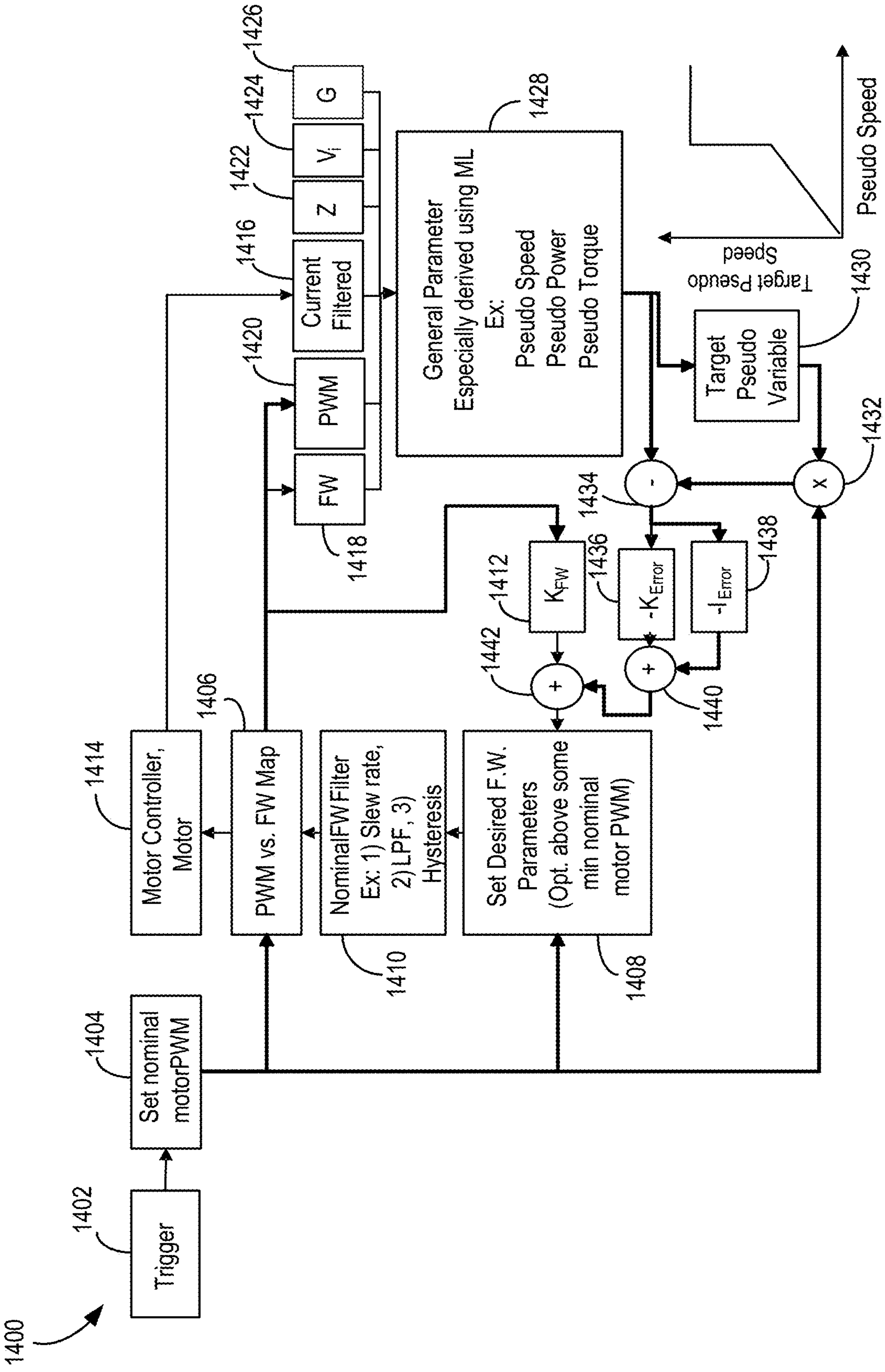
FIG. 14 is a field weakening control program, according to some embodiments described herein.

Turning now to FIG. 14, a control process 1400 for performing field weakening using closed loop control is shown, according to some embodiments. A trigger input is provided at 1402 to the electronic processor 550, which then sets a motor PWM output at 1404 to control a speed of the motor 505 based on the trigger input, such as via trigger 510.

The PWM value is input into a PWM vs. Field Weakening ("FW") map at 1406. The PWM vs. FW map may include one or more field weakening parameters that are correlated to a given PWM value. In some embodiments, the PWM vs. FW map is a lookup table. In other embodiments, the PWM vs. FW map includes one or more functions to determine one or more field weakening parameters based on the received PWM value. In one example, the mapping function may be: MotorPWM=min(nominalPWM+nominal FW, 100); FW max(nominalFW+nominalPWM−100, 0), wherein the nominalPWM value is equal to a PWM value associated with the trigger signal; and the nominalFW value is based on one or more filtered field weakening parameters, as described below.

The PWM value is also input to the processing unit 557, which sets one or more field weakening parameters at 1408 based on the filtered current and the field weakening compensation factor. Example field weakening parameters may include advance angle, freewheel angle, conduction angle, etc.

One or more filters may then be applied to the field weakening parameters at 1410. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The filtered field weakening parameters are then provided back to the PWM vs. FW map at 1406, to allow for the PWM vs. FW map to be updated based on the filtered field weakening parameters. Additionally, the filtered field weakening parameters may also be used as an input to generate and/or modify the field weakening compensation factor at 1412.

A PWM value and one or more field weakening parameters are output to a motor controller at 1414 based on the output from the PWM vs. FW map. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above. While the control process 1400 is described as being performed by one or more components of the power tool 500, it is understood that the control process 1400 may be executed by one or more components, such as the electronic processor 550, the processing unit 557, the control unit 572, or other components, either alone or in combination. Any reference to a specific component of the power tool 500 is for illustrative purposes and should not understood as limiting any functions to any one or more components.

One or more sensors, such as sensors 530 described above, are then configured to monitor one or more parameters associated with the operation of the power tool 500. In one embodiment, a motor current 1416 is sensed and filtered. One or more field weakening parameters 1418 are provided by the PWM vs. FW map at 1406, and an associated PWM value 1420 is provided by the PWM vs. FW map at 1406. Additionally, a battery impedance ("Z") 1422 is sensed. In one embodiment, the battery impedance 1422 is sensed using the one or more sensors 530. In other embodiments, the battery impedance 1422 is sensed by one or more sensors within the battery pack 480, and transmitted to the power tool 500, such as via the power interface 515. An initial battery voltage ("Vi") 1424 is further sensed. In one embodiment, the battery voltage 1424 is sensed using the one or more sensors 530. In other embodiments, the battery voltage 1424 is sensed by one or more sensors within the battery pack 480, and transmitted to the power tool 500, such as via the power interface 515. One or more tool motion inputs ("G") 1426 may also be sensed. For example, the sensors 530 may include one or more gyroscopes and/or accelerometers, which may provide the one or more tool motion inputs 1426.

The sensed parameters are then evaluated by one or more components of the electronic control assembly 536 at 1428 to derive one or more general parameters, such as pseudo speed, pseudo power, pseudo torque, etc., which may then be used to modify one or more field weakening parameters, as described herein. In one embodiment, the electronic processor 550 uses one or more processes or algorithms to generate the one or more general parameters. In other embodiments, the machine learning controller 540 generates the general parameters using one or more machine learning algorithms, such as those described above. For example, the machine learning controller 540 may use one or more of a DNN, RNN, CNN, or regression to derive the general parameters. In other examples, the machine learning controller 540 may derive the general parameters using one or more analytic functions, such as a polynomial regression. Further, parameters such as the battery impedance 1422 and the battery voltage 1424 may be used to adjust maximum general parameter values to account for the maximum output of the tool. For example, when speed control is used to control the motor 505, the following equation may be used to determine a maximum target speed parameter:

$$\text{Max Target} = \frac{V_i}{V_{max}} * \text{Original Max Target},$$

where $V_{max}$ is the maximum voltage output of the battery.

One or more of the general parameters may be output at 1430 and mixed with the set motor PWM output at 1432. The combined general parameters are then combined with the one or more general parameters at 1434 to determine a difference (i.e., error) between the combined general parameters and the one or more general parameters output at 1428. A proportional error is then determined at 1436 based on the determined difference, and an integral error is determined at 1438 based on the determined difference. The proportional error and the integral error are both combined into an error value at 1440. While shown as a proportional-integral ("PI") control in FIG. 14, it is contemplated that other closed loop control schemes such as proportional, integral, proportional-integral-derivative ("PID"), feedforward, lead-lag, and the like may also be used to provide closed loop control. The combined error value is then combined with the field weakening compensation factor at 1442.

In some embodiments, the field weakening compensation factor may include one or more of an advance angle, a conduction angle, and/or a freewheel angle compensation factor. The field weakening compensation factor compensates for potential lost efficiency when simply adding field weakening naturally, such as described above in control process 1000. In some embodiments, the field weakening compensation factor is described as a constant. In other embodiments, the field weakening compensation factor may be a linear and/or non-linear function which provides the field weakening compensation factor based on one or more various parameters, such as motor current, speed, etc. In some embodiments, the field weakening compensation factor is adjusted based on feedback from one or more field weakening filters, as described below. In further examples, the field weakening compensation factor may be based, at least in part, on an output from the PWM vs. FW map generated at 1406.

The combined general parameters and field weakening compensation factor are output to the processing unit 557, which may be configured to modify one or more field weakening parameters at 1408 based on the general parameters and the field weakening compensation factor. Example field weakening parameters may include advance angle, freewheel angle, conduction angle, etc.

Figure 15:
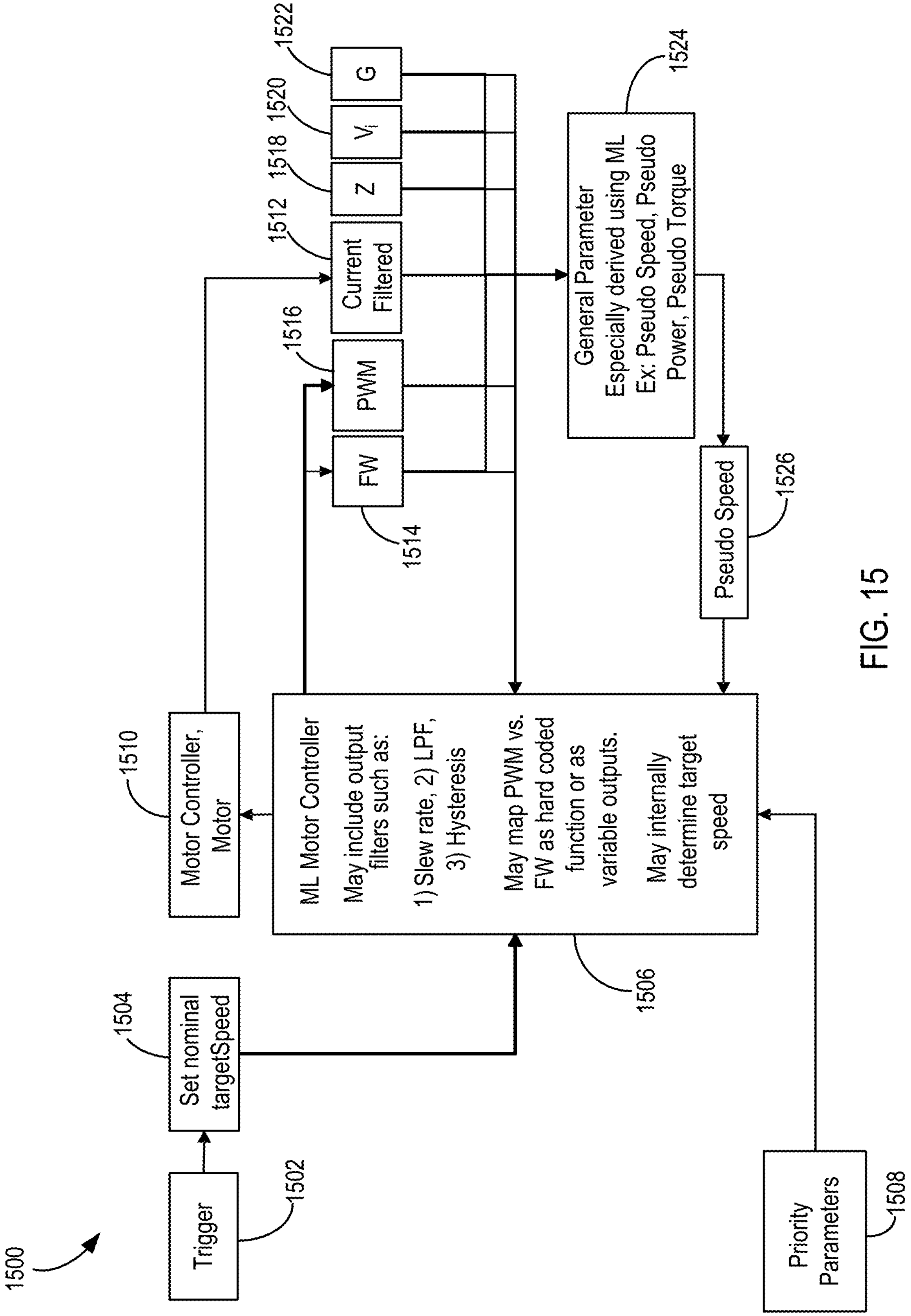
FIG. 15 is field weakening control program, according to some embodiments described herein.

Turning now to FIG. 15, a control process 1500 for performing field weakening using closed loop control with machine learning is shown, according to some embodiments. A trigger input is provided at 1502 to the electronic processor 550, which then sets a nominal target speed value at 1504 to control a speed of the motor 505 based on the trigger input, such as via trigger 510. While the control process 1500 is described as being performed by one or more components of the power tool 500, it is understood that the control process 1500 may be executed by one or more components, such as the electronic processor 550, the processing unit 557, the control unit 572, the machine learning controller 540, and/or other components, either alone or in combination. Any reference to a specific component of the power tool 500 is for illustrative purposes and should not understood as limiting any functions to any one or more components.

The nominal target speed value is input into the machine learning controller 540 at 1506. Additionally, one or more priority parameters may be determined at 1508 and provided to the machine learning controller 540 at 1506. In some embodiments, the machine learning controller 540 determines which parameters to prioritize. For example, the machine learning controller 540 may prioritize various parameters such as speed control, maximum speed, maximum power, maximum efficiency, a desired torque-speed profile, etc. In some embodiments, the machine learning controller 540 may prioritize the parameters based on the application. For example, auger bits may operate best using constant speed control, while hole saws might operate best when efficiency is maximized. As described above, the machine learning controller 540 may be configured to determine an application.

The priority parameters may be used to instruct the machine learning controller to prioritize one or more parameters in order to optimize various operations of the power tool 500, such as peak power output, runtime, stability, etc. The machine learning controller 540 may then perform one or more operations using one or more machine learning algorithms. For example, the machine learning controller 540 may internally determine target speed based on the nominal target speed and the one or more priority parameters. The machine learning controller 540 may further determine one or more field weakening parameters based on the nominal target speed, the one or more priority parameters, and/or other sensed values as described in more detail below. The machine learning controller 540 may further be configured to generate a map mapping PWM vs. field weakening parameter values. In one embodiment, the mapping may be performed using a hard-coded function. In other embodiments, the mapping may be performed using variable outputs.

The machine learning controller 540 may further be configured to filter one or more determined field weakening parameters using one or more machine learning algorithms. For example, the machine learning controller 540 may be configured to use one or more nonlinear filters to filter the one or more determined field weakening parameters. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed. In some examples, the machine learning controller 540 may be configured to provide one or more recommendations with respect to an ideal use of field weakening. For example, the machine learning controller 540 may generate various recommendations for field weaking use, such as ideal use for various operations or operating modes of a specific tool. These recommendations may be provided to a user, such as via an external device, such as external device 107.

In some embodiments, the machine learning controller 540 may further evaluate various inputs to determine the required field weakening parameters. For example, a non-machine learning algorithm may determine the priority parameters based on various inputs, such as user defined inputs and/or sensor derived inputs. The inputs may include battery data, such as battery voltage, battery chemistry, remaining battery capacity, battery impedance, battery life (e.g., coulomb count), battery temperature, presence of nearby batteries; battery charging data, such as tool charging patters for a user, time of day, accepted battery drain, other tools being used with same battery pack; and temperature data, such as ambient temperature, battery temperature, and/or tool temperature. Other inputs may include trigger depression values, previously identified accessory/application/task/and/or typical associated loading characteristics, tool modes (e.g., screw seating, drilling, hammer drilling), profile of application (e.g., is tool passing through FW region or staying there), activation of field weakening only during deceleration, energy request, hand rotation, loading by user, and/or feel profile (e.g., use of field weakening to improve speed control for gradual ramps up and down). It is understood that other inputs may be used as well, as appropriate for a given application. Additionally, the tool may include one or more user inputs, such as knobs, buttons, dials, or other user interfaces (such as via an external device, such as external device 107) which can allow for a user provide input related to the field weakening parameters (e.g., increase or decrease field weakening, vary when field weakening is applied, etc.)

While the above embodiments describe using machine learning algorithms to determine the field weakening parameters, it is understood that non-machine learning algorithms may also be used. For example, where the logic flow or inputs are more simplistic, such as where field weakening is based on a single parameter such as trigger depression, non-machine learning algorithms may be used, such as look-up table based algorithms, to generate the field weakening parameters.

The machine learning controller 540 then outputs one or more motor drive parameters to the motor controller at 1510. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above.

One or more sensors, such as sensors 530 described above, are configured to monitor one or more parameters associated with the operation of the power tool 500. In one embodiment, a motor current 1512 is sensed and filtered. One or more field weakening parameters 1514 are generated by the machine learning controller 540, and an associated PWM value 1516 is output by the machine learning controller 540. Additionally, a battery impedance ("Z") 1518 is sensed. In one embodiment, the battery impedance 1518 is sensed using the one or more sensors 530. In other embodiments, the battery impedance 1518 is sensed by one or more sensors within the battery pack 480, and transmitted to the power tool 500, such as via the power interface 515. An initial battery voltage ("Vi") 1520 is further sensed. In one embodiment, the battery voltage 1520 is sensed using the one or more sensors 530. In other embodiments, the battery voltage 1520 is sensed by one or more sensors within the battery pack 480, and transmitted to the power tool 500, such as via the power interface 515. One or more tool motion inputs ("G") 1522 may also be sensed. For example, the sensors 530 may include one or more gyroscopes and/or accelerometers, which may provide the one or more tool motion inputs 1522.

The sensed parameters are then evaluated by the machine learning controller 540 using one or more machine learning algorithms at 1524 to derive one or more general parameters, such as pseudo speed, pseudo power, pseudo torque, etc., which may then be used to modify one or more field weakening parameters, as described herein. In one embodiment, the machine learning controller uses one or more processes or algorithms to generate the one or more general parameters. For example, the machine learning controller 540 may use one or more of a DNN, RNN, CNN, or regression to derive the general parameters. In other examples, the machine learning controller 540 may derive the general parameters using one or more analytic functions, such as a polynomial regression. Further, parameters such as the battery impedance 1518 and the battery voltage 1520 may be used to adjust maximum general parameter values to account for the maximum output of the tool. While the above general parameters are generated with the machine learning controller 540, it is contemplated that other components, such as the electronic processor 550 may be configured to generate the general parameters using non-machine learning algorithms. For example, the machine learning controller 540 may be configured to determine the priority parameters (e.g., speed control), while the electronic processor 550 may be configured to handle the actual control of the motor via the motor controller 1510.

The one or more determined general parameters are provided to the machine learning controller 1506, which is then configured to use the general parameters as an additional input when performing the functions described above. Additionally, by directly providing the general parameters to the machine learning controller 540, the machine learning controller may use one or more machine learning algorithms to drive the motor output to maintain the general parameters. For example, where the general parameter is a pseudo speed parameter, the machine learning controller may determine one or more motor output values (e.g., PWM) in conjunction with one or more field weakening parameters to maintain the output such that the pseudo speed value remains constant, thereby providing a constant output at the motor.

As described in detail above, the machine learning controller 540 may be configured to receive user feedback or other inputs to modify its operation over time. Thus, in some embodiments, the machine learning controller 540 may adapt over time with regards to generating field weakening parameters based on feedback and other inputs. In other embodiments, the machine learning controller 540 may use static algorithms that do not change based on feedback from a user, or other inputs.

Figure 16:
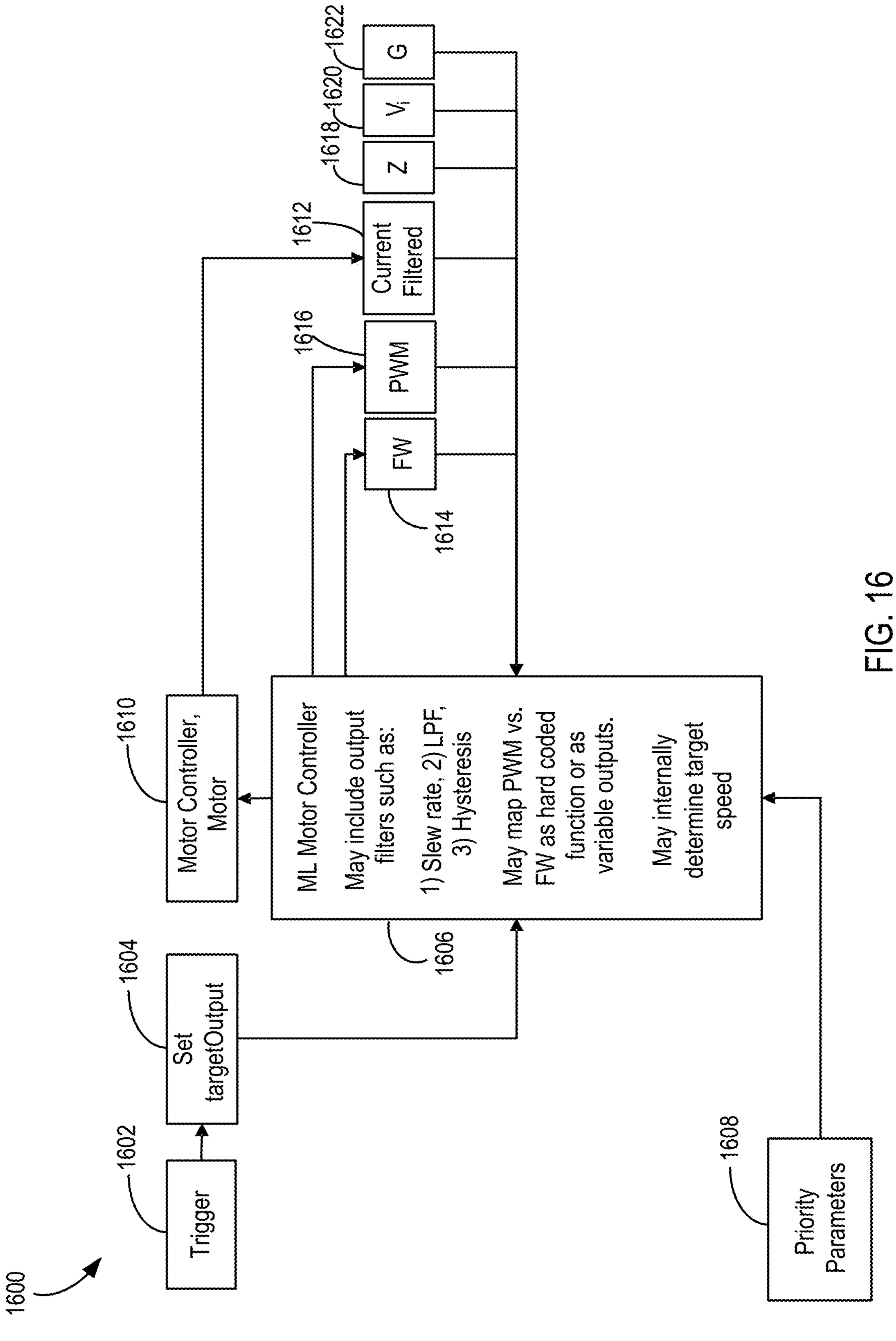
FIG. 16 is a field weakening control program, according to some embodiments described herein.

Turning now to FIG. 16, a control process 1600 for performing field weakening using closed loop control entirely by machine learning is shown, according to some embodiments. A trigger input is provided at 1602 to the electronic processor 550, which then sets a nominal target speed value at 1604 to control a speed of the motor 505 based on the trigger input, such as via trigger 510. While the control process 1600 is described as being performed by one or more components of the power tool 500, it is understood that the control process 1600 may be executed by one or more components, such as the electronic processor 550, the processing unit 557, the control unit 572, the machine learning controller 540, and/or other components, either alone or in combination. Any reference to a specific component of the power tool 500 is for illustrative purposes and should not understood as limiting any functions to any one or more components. As shown in FIG. 16, a single machine learning controller 540 can be used to derive and/or determine any required parameter or other data to perform the required field weakening based on raw sensor data, as described below.

The nominal target speed value is input into the machine learning controller 540 at 1606. Additionally, one or more priority parameters may be determined at 1608 and provided to the machine learning controller 540 at 1606. The priority parameters may be used to instruct the machine learning controller to prioritize one or more parameters in order to optimize various operations of the power tool 500, such as peak power output, runtime, stability, etc. The machine learning controller 540 may then perform one or more operations using one or more machine learning algorithms. For example, the machine learning controller 540 may internally determine target speed based on the nominal target speed and the one or more priority parameters. The machine learning controller 540 may further determine one or more field weakening parameters based on the nominal target speed, the one or more priority parameters, and/or other sensed values as described in more detail below. The machine learning controller 540 may further be configured to generate a map mapping PWM vs. field weakening parameter values. In one embodiment, the mapping may be performed using a hard-coded function. In other embodiments, the mapping may be performed using variable outputs. The machine learning controller 540 may further be configured to filter one or more determined field weakening parameters using one or more machine learning algorithms. The filters may be utilized to increase the stability of the system (e.g., prevent unnecessary oscillations within the system) when field weakening is applied. Example filters may include a slew rate filter, a low pass filter, and/or a hysteresis filter; however, other filter types are contemplated. The slew rate filter may be configured to limit the maximum or minimum rate of an increase and/or decrease of the one or more field weakening parameters. The low pass filter may be configured to smooth an output response of the field weakening parameters and is often applied after the other filters are applied. The hysteresis filter may also aid in stability by only allowing changes to the field weakening parameters once the changes exceed a predetermined value. This may prevent slight changes (e.g., less than 10% variation) from constantly being performed.

The machine learning controller 540 then outputs one or more motor drive parameters to the motor controller at 1610. The motor controller may be a switching network, such as switching network 517, configured to control the motor based on the PWM provided by the electronic processor 550. In other embodiments, the motor controller is one or more of the switching network 517 and an electronic controller, such as electronic processor 550 described above.

One or more sensors, such as sensors 530 described above, are configured to monitor one or more parameters associated with the operation of the power tool 500. In one embodiment, a motor current 1612 is sensed and filtered. One or more field weakening parameters 1614 are by the machine learning controller 540, and an associated PWM value 1616 is output by the machine learning controller 540. Additionally, a battery impedance ("Z") 1618 is sensed. In one embodiment, the battery impedance 1618 is sensed using the one or more sensors 530. In other embodiments, the battery impedance 1618 is sensed by one or more sensors within the battery pack 480, and transmitted to the power tool 500, such as via the power interface 515. An initial battery voltage ("Vi") 1620 is further sensed. In one embodiment, the battery voltage 1620 is sensed using the one or more sensors 530. In other embodiments, the battery voltage 1620 is sensed by one or more sensors within the battery pack 480, and transmitted to the power tool 500, such as via the power interface 515. One or more tool motion inputs ("G") 1622 may also be sensed. For example, the sensors 530 may include one or more gyroscopes and/or accelerometers, which may provide the one or more tool motion inputs 1622.

The sensed parameters are then evaluated by the machine learning controller 540 using one or more machine learning algorithms at 1606 to derive one or more general parameters, such as pseudo speed, pseudo power, pseudo torque, etc., which may then be used to modify one or more field weakening parameters, as described herein. In one embodiment, the machine learning controller uses one or more processes or algorithms to generate the one or more general parameters. For example, the machine learning controller 540 may use one or more of a DNN, RNN, CNN, or regression to derive the general parameters. In other examples, the machine learning controller 540 may derive the general parameters using one or more analytic functions, such as a polynomial regression. Further, parameters such as the battery impedance 1618 and the battery voltage 1620 may be used to adjust maximum general parameter values to account for the maximum output of the tool.

The machine learning controller 540 may use one or more machine learning algorithms to drive the motor output to maintain the one or more determined general parameters. For example, where the general parameter is a pseudo speed parameter, the machine learning controller may determine one or more motor output values (e.g., PWM) in conjunction with one or more field weakening parameters to maintain the output such that the pseudo speed value remains constant, thereby providing a constant output at the motor.

As described in detail above, the machine learning controller 540 may be configured to receive user feedback or other inputs to modify its operation over time. Thus, in some embodiments, the machine learning controller 540 may adapt over time with regards to generating field weakening parameters based on feedback and other inputs. In other embodiments, the machine learning controller 540 may use static algorithms that do not change based on feedback from a user, or other inputs.

Figure 17:
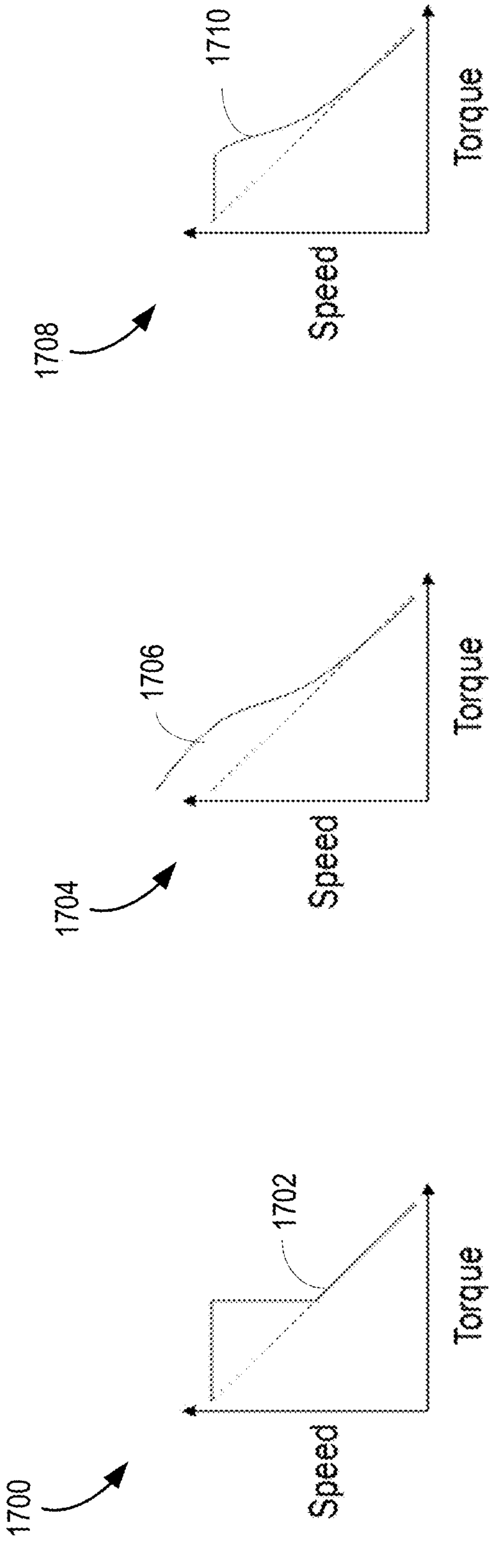
FIG. 17 is a series of speed-torque curves, according to some embodiments described herein.

Turning now to FIG. 17, a series of speed-torque curves are shown, according to some embodiments. Plot 1700 shows an ideal speed-torque curve 1702. The ideal speed-torque curve 1702 may use speed clipping to create a sharp knee where the speed quickly decreases as the torque increases. This allows for the no load speed initially be high and be maintained as torque increases across a range. Plot 1704 shows a simulated speed-torque curve 1706 using standard field weakening techniques. As shown in plot 1704, the no-load speed is able to be boosted, but a defined knee is not achieved as shown in plot 1700. Finally, plot 1708 shows a speed-torque curve 1710 using pseudo parameters to control field weakening, as described in detail above. Specifically, a pseudo speed clipping technique may be used to provide a more constant speed at low torque values (e.g., no-load torque). The speed-torque curve 1710 described above may be implemented or achieved using one of the field weakening control schemes described in detail above.

Thus, embodiments described herein provide, among other things, power tools and related systems including a machine learning controller to control a feature or function of the power tool or related system. Various features and advantages of the embodiments are set forth in the following claims.

What is claimed is:

1. A power tool comprising:
- a housing;
- a motor supported by the housing;
- a battery pack supported by the housing and configured to provide electrical power to the power tool;
- a user input configured to provide an input signal corresponding to a target speed of the motor;
- a plurality of sensors supported by the housing and configured to generate sensor data indicative of an operational parameter of the power tool; and
- an electronic controller, the electronic controller including an electronic processor and a memory, the memory including a machine learning control program for execution by the electronic processor, the electronic controller configured to:
  - receive the target speed,
  - receive the sensor data,
  - generate, using the machine learning control program, an output including a field weakening parameter based on the sensor data, the field weakening parameter including a first conduction angle value that modifies a conduction angle of the motor,
  - control the motor based on the generated output to achieve the target speed,
  - receive feedback data from the plurality of sensors indicative of control of the motor based on the generated output,
  - adjust the machine learning control program to generate a second output including a second field weakening parameter based on the feedback data, the second field weakening parameter including a second conduction angle value that modifies the conduction angle of the motor, and
  - control the motor based on the generated second output to achieve the target speed.

2. The power tool of claim 1, wherein the electronic controller is further configured to:
- access tool usage information indicative of previous control of the motor stored in the memory;
- build the machine learning control program based on the tool usage information;
- train the machine learning control program based on the tool usage information; and
- store the machine learning control program in the memory.

3. The power tool of claim 1, wherein the machine learning control program is adjusted through training based on example sensor data and the feedback data.

4. The power tool of claim 1, wherein the machine learning control program is a trainable machine learning control program.

5. The power tool of claim 1, wherein the sensor data includes one or more of a motor current, a battery pack impedance, a battery pack voltage, and a motion of the power tool.

6. The power tool of claim 1, wherein the field weakening parameter and the second field weakening parameter each also include one or more of an advance angle value and a freewheel angle value, the freewheel angle value corresponding to when a motor winding of the motor is disconnected from an excitation voltage.

7. The power tool of claim 1, wherein the electronic controller is further configured to filter the field weakening parameter and the second field weakening parameter using one or more filters.

8. The power tool of claim 1, wherein the electronic controller is further configured to:
- receive one or more priority parameter values, wherein the machine learning control program generates the output based on the sensor data and the priority parameter values.

9. A method of operating a power tool to control field weakening, the method comprising:
- receiving, by an electronic controller of the power tool, an input signal corresponding to a target speed of a motor of the power tool from a user input;
- receiving, by the electronic controller, sensor data indicative of an operational parameter of the power tool from a plurality of sensors, the electronic controller including an electronic processor and a memory, wherein the memory includes a machine learning control program for execution by the electronic processor;

generating, using the machine learning control program, an output including a field weakening parameter based on the sensor data, the field weakening parameter including a first conduction angle value that modifies a conduction angle of the motor;

controlling, by the electronic controller, the motor based on the generated output to achieve the target speed;

receiving, by the electronic controller, feedback data from the plurality of sensors indicative of control of the motor based on the generated output;

adjusting, by the electronic controller, the machine learning control program to generate a second output including a second field weakening parameter based on the feedback data, the second field weakening parameter including a second conduction angle value that modifies the conduction angle of the motor; and controlling, by the electronic controller, the motor based on the generated second output to achieve the target speed.

10. The method of claim 9, further comprising:

accessing, by the electronic controller, tool usage information indicative of previous control of the motor stored in the memory;

building, by the electronic controller, the machine learning control program based on the tool usage information;

training, by the electronic controller, the machine learning control program based on the tool usage information; and storing, by the electronic controller, the machine learning control program in the memory.

11. The method of claim 9, wherein generating the machine learning control program includes training, by the electronic controller, the machine learning control program based on example sensor data and the feedback data.

12. The method of claim 9, wherein the machine learning control program is a trainable machine learning control program.

13. The method of claim 9, wherein the sensor data includes one or more of a motor current, a battery pack impedance, a battery pack voltage, and a motion of the power tool.

14. The method of claim 9, wherein the field weakening parameter and the second field weakening parameter each also include one or more of an advance angle value and a freewheel angle value, the freewheel angle value corresponding to when a motor winding of the motor is disconnected from an excitation voltage.

15. The method of claim 9, further comprising:

filtering, by the electronic controller, the field weakening parameter and the second field weakening parameter using one or more filters.

16. The method of claim 9, further comprising:

receiving, by the electronic controller, one or more priority parameter values, wherein the machine learning control program generates the output based on the sensor data and the priority parameter values.

17. A power tool system comprising:

a server including a server electronic processor and a server memory, the server electronic processor configured to:

access tool usage information indicative of previous control of a plurality of power tools of the power tool system stored in the server memory, build a machine learning control program based on the tool usage information, train the machine learning control program based on the tool usage information, and transmit the machine learning control program to the plurality of power tools; and a power tool of the plurality of power tools, the power tool including:

a housing, a motor supported by the housing, a battery pack supported by the housing and configured to provide electrical power to the power tool, a user input configured to provide an input signal corresponding to a target speed of the motor, a plurality of sensors supported by the housing and configured to generate sensor data indicative of an operational parameter of the power tool, a tool electronic controller, the tool electronic controller including a tool electronic processor and a tool memory, the tool electronic controller configured to:

receive the machine learning control program from the server electronic processor, store the machine learning control program in the tool memory for execution by the tool electronic processor, receive the target speed, receive the sensor data, generate, using the machine learning control program, an output including a field weakening parameter based on the sensor data, the field weakening parameter including a first conduction angle value that modifies a conduction angle of the motor, control the motor based on the generated output to achieve the target speed, and receive feedback data from the plurality of sensors indicative of the control of the motor based on the generated output.

18. The power tool system of claim 17, wherein the server electronic processor is further configured to:

receive, via the tool electronic controller, the feedback data from the plurality of sensors;

adjust the machine learning control program to generate a second output including a second field weakening parameter based on the feedback data, the second field weakening parameter including a second conduction angle value that modifies the conduction angle of the motor; and transmit the adjusted machine learning control program to the power tool.

19. The power tool system of claim 17, wherein the machine learning control program is adjusted through training based on example sensor data and the feedback data.

20. The power tool system of claim 17, wherein the field weakening parameter and the second field weakening parameter each also include one or more of an advance angle value and a freewheel angle value, the freewheel angle value corresponding to when a motor winding of the motor is disconnected from an excitation voltage.

* * * * *